(12) United States Patent
Fujii et al.

(10) Patent No.: US 10,993,431 B2
(45) Date of Patent: May 4, 2021

(54) DISPLAY DEVICE INCLUDING DATA DIVIDER

(71) Applicant: Samsung Display Co., Ltd., Yongin-Si (KR)

(72) Inventors: Mitsuru Fujii, Yongin-si (KR); Ji Ye Moon, Yongin-si (KR); Ju Gon Seok, Yongin-si (KR); Hoo Hyeon Lee, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/851,188

(22) Filed: Apr. 17, 2020

(65) Prior Publication Data

US 2020/0265773 A1 Aug. 20, 2020

(30) Foreign Application Priority Data

Nov. 12, 2019 (KR) .................. 10-2019-0144509

(51) Int. Cl.
*A01M 29/10* (2011.01)
*G09G 3/20* (2006.01)

(52) U.S. Cl.
CPC .......... *A01M 29/10* (2013.01); *G09G 3/2092* (2013.01); *G09G 2310/0275* (2013.01); *G09G 2320/0209* (2013.01)

(58) Field of Classification Search
CPC .. G09G 3/3614; G09G 3/3688; G09G 3/3648; G09G 2310/027; G09G 2310/0297; G09G 2310/08; G09G 3/3677; G09G 3/3233; G09G 2330/021; G09G 3/3291; G09G 3/3696; G09G 2310/0291; G09G 2320/0233; G09G 3/3685; G09G 2300/0426; G09G 2300/0842; G09G 2300/0452; G09G 2310/0251; G09G 3/3266; G09G 2310/0248; G09G 2320/0252; G09G 2300/0819; G09G 2300/0861; G09G 2310/0205; G09G 2320/0209; G09G 2320/0261; G09G 2320/0673; G09G 3/20; G09G 3/3607; G09G 3/3655; G09G 3/3674; G09G 2320/0247; G09G 2320/043; G09G 2330/023; G09G 2330/028; G09G 2340/0435; G09G 3/2003; G09G 2310/0213; G09G 2310/0224; G09G 2310/0286; G09G 2320/0242; G09G 3/3275; G09G 2310/0262; G09G 2310/0267; G09G 2310/0275; G09G 2310/061; G09G 2320/02;

(Continued)

(56) References Cited

U.S. PATENT DOCUMENTS 5,583,558 A * 12/1996 Yajima .................. G06K 15/02
347/237
10,238,100 B2 * 3/2019 Henskes ............... A01M 29/10

(Continued)

FOREIGN PATENT DOCUMENTS

KR 10-2011-0063021 A 6/2011

*Primary Examiner* — Daniel Previl
(74) *Attorney, Agent, or Firm* — Innovation Counsel LLP

(57) ABSTRACT

A display device includes: a data driver for providing data voltages to data output lines; a data divider for coupling the data output lines to data lines; and a data compensator for compensating data voltages based on a load difference between data voltages in adjacent pixel rows.

20 Claims, 18 Drawing Sheets

(58) Field of Classification Search
CPC ... G09G 2320/0219; G09G 2320/0223; G09G 3/3225; G09G 2310/062; G09G 2310/063; G09G 2320/045; G09G 3/2092; G09G 3/3258; G09G 3/3611; G09G 3/3659; G09G 2300/0443; G09G 2300/0804; G09G 2300/0876; G09G 2310/0289; G09G 2310/06; G09G 2320/0257; G09G 2320/0276; G09G 2320/0295; G09G 2320/103; G09G 2330/02; G09G 2340/16; G09G 2354/00; G09G 2360/16; G09G 3/2007; G09G 3/3406; G09G 2300/0809; G09G 2300/0814; G09G 2310/0264; G09G 2310/0294; G09G 2320/0285; G09G 2320/041; G09G 2320/0626; G09G 2320/0666; G09G 2320/10; G09G 2360/18; G09G 3/003; G09G 3/325; G09G 5/02; G09G 2300/0413; G09G 2300/08; G09G 2300/0847; G09G 2300/0852; G09G 2300/0857; G09G 2300/0866; G09G 2310/02; G09G 2310/0235; G09G 2310/0237; G09G 2310/024; G09G 2310/065; G09G 2320/0214; G09G 2320/0238; G09G 2320/0271; G09G 2320/028; G09G 2320/029; G09G 2320/064; G09G 2330/022; G09G 2300/025; G09G 2330/08; G09G 2330/10; G09G 2340/04; G09G 2360/12; G09G 2360/144; G09G 2370/08; G09G 3/22; G09G 3/3241; G09G 3/3283; G09G 5/006; G09G 2300/023; G09G 2300/043; G09G 2300/0447; G09G 2300/0465; G09G 2300/0486; G09G 2300/0823; G09G 2300/0828; G09G 2300/0871; G09G 2310/021; G09G 2310/0218; G09G 2310/0221; G09G 2310/0227; G09G 2310/0232; G09G 2310/0245; G09G 2310/0278; G09G 2310/0281; G09G 2310/0283; G09G 2310/04; G09G 2310/066; G09G 2310/067; G09G 2310/068; G09G 2320/046; G09G 2320/062; G09G 2320/068; G09G 2330/026; G09G 2330/04; G09G 2330/045; G09G 2330/06; G09G 2330/12; G09G 2340/00; G09G 2340/14; G09G 2350/00; G09G 3/006; G09G 3/2011; G09G 3/2014; G09G 3/2025; G09G 3/2085; G09G 3/2096; G09G 3/32; G09G 3/344; G09G 3/348; G09G 3/3618; G09G 3/3651; G09G 3/3666; G09G 5/001; G09G 5/04; G09G 5/06; G09G 5/10; G09G 5/14; G09G 2300/0417; G09G 2300/0439; G09G 2310/0254; G09G 2310/0256; G09G 2320/0646; G09G 2320/0693; G09G 2330/025; G09G 2340/0428; G09G 2360/016; G09G 2370/04; G09G 3/2074; G09G 3/30; G09G 3/3208; G09G 3/3413; G09G 3/3605; G09G 3/364; G09G 5/00; G09G 5/008; G09G 5/18; G02F 1/136286; G02F 1/3338; G02F 1/1368; G02F 1/133707; G02F 1/13454; G02F 1/136204; G02F 2001/134345; G02F 2001/13456; G02F 2203/30; G06F 3/0412; G06F 3/0416; G06F 3/04166; G06F 3/044; G06F 3/0446; G06F 1/3262; G06F 3/0418; G06F 3/04184; G06F 3/0443; G06F 3/047; H04N 13/341; H04N 13/398; H04N 5/202; H04N 13/315; G06K 9/0051; G11C 19/00; G11C 19/28; G11C 19/287; G11C 7/10; G11C 7/1087; H01L 27/3216; H01L 27/3218; H01L 27/3276
USPC .... 340/573.2, 5.1, 5.8, 545.3, 551, 578, 641
See application file for complete search history.

(56) References Cited

U.S. PATENT DOCUMENTS

| | | | | |
|---|---|---|---|---|
| 10,660,325 | B2* | 5/2020 | Henskes | A01M 29/10 |
| 2006/0061795 | A1* | 3/2006 | Walmsley | G06F 21/73 |
| | | | | 358/1.14 |
| 2006/0087525 | A1* | 4/2006 | Jackson Pulver | B41J 2/04541 |
| | | | | 347/12 |
| 2007/0273677 | A1* | 11/2007 | Kim | G09G 3/3648 |
| | | | | 345/204 |

* cited by examiner

<Related Art>

DISPLAY DEVICE INCLUDING DATA DIVIDER

CROSS-REFERENCE TO RELATED APPLICATION

The present application claims priority under 35 U.S.C. § 119(a) to Korean patent application No. 10-2019-0144509 filed on Nov. 12, 2019 in the Korean Intellectual Property Office, the entire disclosure of which is incorporated herein by reference.

BACKGROUND

1. Technical Field

The present disclosure generally relates to a display device.

2. Related Art

With the development of information technologies, the importance of a display device which is a connection medium between a user and information increases. Accordingly, display devices such as a liquid crystal display device, an organic light emitting display device, and a plasma display device are increasingly used.

A display device displays an image frame by using a combination of lights emitted from a plurality of pixels. A line crosstalk defect may occur, which deteriorates display quality according to a pattern of the image frame. When the line crosstalk defect occurs, an unintended bright line or dark line is displayed, and therefore, a user may recognize the bright line or dark line as an error.

SUMMARY

Embodiments provide a display device capable of minimizing a line crosstalk defect when a data divider is used.

In accordance with an aspect of the present disclosure, there is provided a display device including: a data driver configured to provide first data voltages to data output lines during a first period, provide second data voltages to the data output lines during a second period after the first period, provide third data voltages to the data output lines during a third period after the second period, and provide fourth data voltages during a fourth period after the third period; a data divider configured to couple the data output lines to first data lines during the first period, couple the data output lines to second data lines during the second period, couple the data output lines to the first data lines during the third period, and couple the data output lines to the second data lines during the fourth period; first pixels configured to receive voltages charged in the first data lines and the second data lines after an initial time of the second period and before an initial time of the third period; second pixels configured to receive voltages charged in the first data lines and the second data lines after an initial time of the fourth period; and a data compensator configured to compensate the third data voltages and the fourth data voltages based on a first load difference between the first data voltages and the third data voltages, and a second load difference between the second data voltages and the fourth data voltages.

The data compensator may include: a first load calculator configured to sequentially output a load value of the first data voltages and a load value of the third data voltages; and a second load calculator configured to sequentially output a load value of the second data voltages and a load value of the fourth data voltages.

The data compensator may further include: a first delay configured to output the load value of the first data voltages after a predetermined delay time; and a second delay configured to output the load value of the second data voltages after the predetermined delay time.

The predetermined delay time may be one horizontal period.

The data compensator may further include: a first load difference calculator configured to output the first load difference based on an output of the first load calculator and an output of the first delay; and a second load difference calculator configured to output the second load difference based on an output of the second load calculator and an output of the second delay.

The data compensator may further include a crosstalk calculator configured to calculate a first crosstalk amount with respect to the third data voltages and a second crosstalk amount with respect to the fourth data voltages based on the first load difference and the second load difference.

The first crosstalk amount may be a value obtained by adding up the first load difference to which a first weight value is applied and the second load difference to which a second weight value is applied, and the second crosstalk amount may be a value obtained by adding up the first load difference to which a third weight value is applied and the second load difference to which a fourth weight value is applied.

A sign of each of the first weight value, the third weight value, and the fourth weight value may be different from that of the second weight value.

The data compensator may further include a crosstalk compensator configured to compensate the third data voltages based on the first crosstalk amount and compensate the fourth data voltages based on the second crosstalk amount.

Each of the first pixels and the second pixels may include a P-type transistor. Each of the first weight value, the third weight value, and the fourth weight value may be a positive number, and the second weight value may be a negative number. The crosstalk compensator may increase the third data voltages as the first crosstalk amount increases, and increase the fourth data voltages as the second crosstalk amount increases.

The data driver may provide fifth data voltages to the data output lines during a fifth period between the second period and the third period, and provide sixth data voltages to the data output lines during a sixth period after the fourth period. The data divider may couple the data output lines to third data lines during the fifth period and couple the data output lines to the third data lines during the sixth period. The first pixels may receive voltages charged in the first data lines, the second data lines, and the third data lines after an initial time of the fifth period and before an initial time of the third period, and the second pixels may receive voltages charged in the first data lines, the second data lines, and the third data lines after the sixth period is started.

The data compensator may compensate the third data voltages, the fourth data voltages, and the sixth data voltages based on the first load difference, the second load difference, and a third load difference between the fifth data voltages and the sixth data voltages.

The data compensator may further include a third load calculator configured to sequentially output a load value of the fifth data voltages and a load value of the sixth data voltages.

The data compensator may further include a third delay configured to output the load value of the fifth data voltages after the predetermined delay time.

The data compensator may further include a third load difference calculator configured to output the third load difference based on an output of the third load calculator and an output of the third delay.

The data compensator may further include a crosstalk calculator configured to calculate a first crosstalk amount with respect to the third data voltages, a second crosstalk amount with respect to the fourth data voltages, and a third crosstalk amount with respect to the sixth data voltages based on the first load difference, the second load difference, and the third load difference.

The first crosstalk amount may be a value obtained by adding up the first load difference to which a first weight value is applied, the second load difference to which a second weight value is applied, and the third load difference to which a third weight value is applied, the second crosstalk amount may be a value obtained by adding up the first load difference to which a fourth weight value is applied, the second load difference to which a fifth weight value is applied, and the third load difference to which a sixth weight value is applied, and the third crosstalk amount may be a value obtained by adding up the first load difference to which a seventh weight value is applied, the second load difference to which an eighth weight value is applied, and the third load difference to which a ninth weight value is applied.

A sign of each of the first weight value, the fourth weight value, the fifth weight value, the seventh weight value, the eighth weight value, and the ninth weight value may be different from that of each of the second weight value, the third weight value, and the sixth weight value.

The data compensator may further include a crosstalk compensator configured to compensate the third data voltages, based on the first crosstalk amount, compensate the fourth data voltages, based on the second crosstalk amount, and compensate the sixth data voltages, based on the third crosstalk amount.

Each of the first pixels and the second pixels may include a P-type transistor. Each of the first weight value, the fourth weight value, the fifth weight value, the seventh weight value, the eighth weight value, and the ninth weight value may be a positive number, and each of the second weight value, the third weight value, and the sixth weight value may be a negative number. The crosstalk compensator may increase the third data voltages as the first crosstalk amount increases, increase the fourth data voltages as the second crosstalk amount increases, and increase the sixth data voltages as the third crosstalk amount increases.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
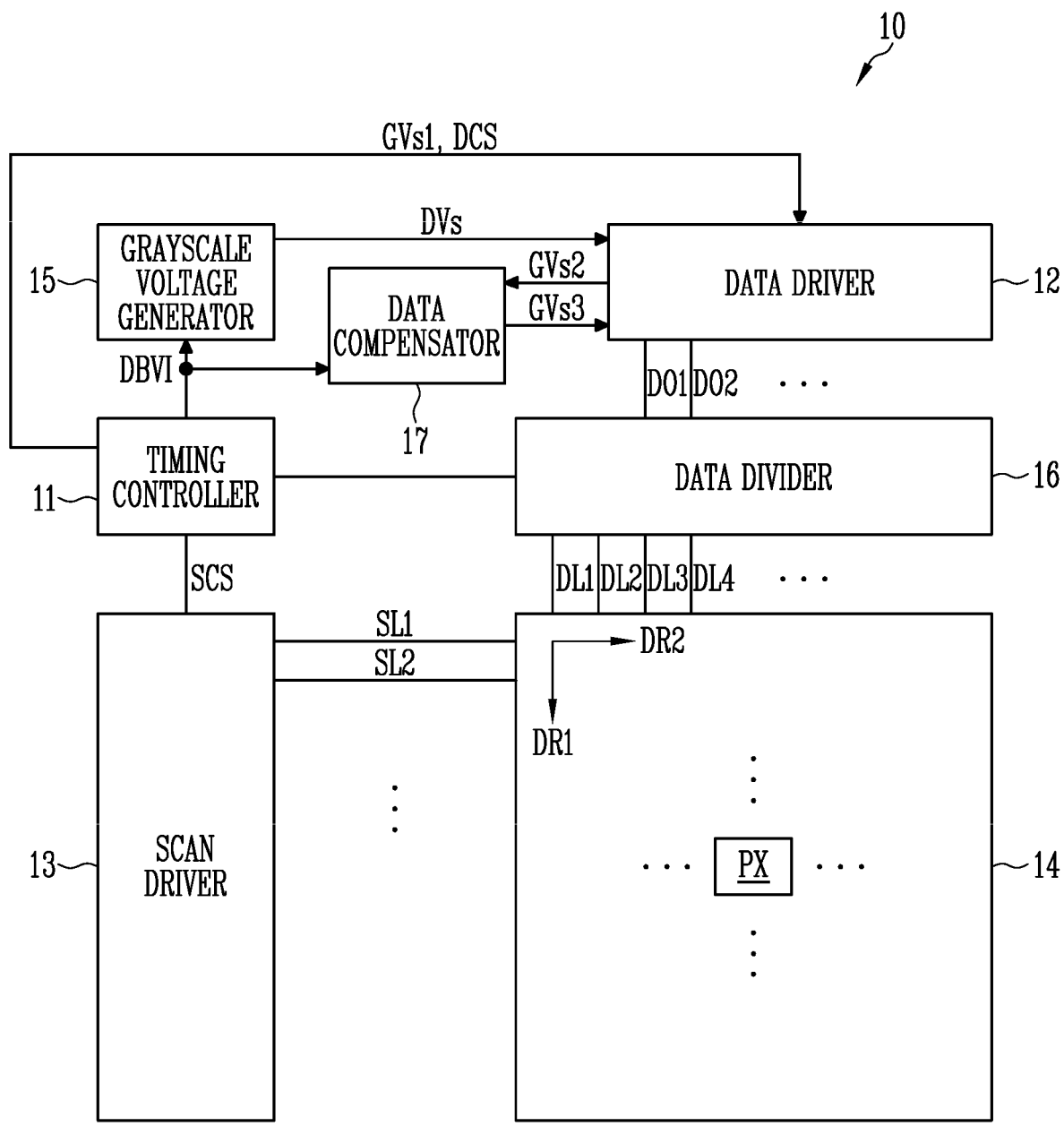
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

FIG. 1 is a diagram illustrating a display device in accordance with an embodiment of the present disclosure.

Referring to FIG. 1, the display device 10 in accordance with the embodiment of the present disclosure may include a timing controller 11, a data driver 12, a scan driver 13, pixels 14, a grayscale voltage generator 15, a data divider 16, and a data compensator 17.

The timing controller 11 may receive grayscale values and control signals of each frame from an external processor. The timing controller 11 may convert grayscale values to signals correspond to specifications of the display device 10. For example, the external processor may provide a red grayscale value, a green grayscale value, and a blue grayscale value with respect to each unit dot. For example, when the pixels 14 has an RGB stripe, the pixels may correspond one-to-one to the respective grayscale values. Therefore, it may be unnecessary to convert the grayscale values. However, when the pixels 14 has a pentile structure, adjacent unit dots share a pixel, and therefore, pixels may not correspond one-to-one to the respective grayscale values. Accordingly, it may be necessary to convert the grayscale values. Grayscale values GVs1 which are converted or are not converted may be provided to the data driver 12. Also, the timing controller 11 may provide a data control signal DCS to the data driver 12. Also, the timing controller 11 may provide a scan control signal SCS to the scan driver 13.

The data driver 12 may generate data voltages and supplies the generated data voltages to data output lines DO1, DO2, . . . by using the grayscale values GVs1 and the data control signal DCS. The data driver 12 may generate data voltages by performing analog-digital conversion on grayscale values GVs3 compensated by the data compensator 17, using grayscale voltages DVs provided from the grayscale voltage generator 15.

For example, the data driver 12 may provide first data voltages to the data output lines DO1, DO2, . . . during a first period, provide second data voltage to the data output lines DO1, DO2, . . . during a second period after the first period, provide third data voltages to the data output lines DO1, DO2, . . . during a third period after the second period, and provide fourth data voltages to the data output lines DO1, DO2, . . . during a fourth period after the third period.

The scan driver 13 may generate scan signals and supplies the generated scan signals to scan lines SL1, SL2, in response to a clock signal, a scan start signal, and the like supplied from the timing controller 11. The scan driver 13 may sequentially supply scan signals having a pulse of a turn-on level to the scan lines SL1, SL2, . . . . The scan driver 13 may include scan stages configured in the form of shift registers. The scan driver 13 may generate scan signals in a manner that sequentially transfers the scan start signal in the form of a pulse of a turn-on level to a next scan stage under the control of the clock signal. The scan lines SL1, SL2, . . . may extend in a second direction DR2.

The pixels 14 may include a plurality of pixels PX arranged in a matrix configuration. Each of the pixels PX may be coupled to a corresponding data line and a corresponding scan line. The pixels PX may include pixels emitting light of a first color, pixels emitting light of a second color, and pixels emitting light of a third color. The first color, the second color, and the third color may be different colors. For example, the first color may be one color among red, green, and blue, the second color may be another color which is not the first color among the red, green, and blue, and the third color may be the other color which is not the first color and the second color among the red, green, and blue. In addition, magenta, cyan and yellow may be used as the first to third colors, instead of the red, green, and blue. However, for convenience of description, in this embodiment, there is described a case where the red, green, and blue are used as the first color, the second color and the third colors, respectively. The magenta is expressed as a combination of the red and blue, the cyan is expressed as a combination of the green and blue, and the yellow is expressed as a combination of the red and green.

The grayscale voltage generator 15 may generate grayscale voltages DVs, based on an input maximum luminance value DBVI. Hereinafter, for convenience of description, a case where a total of 256 grayscales from grayscale 0 (minimum grayscale) to grayscale 255 (maximum grayscale) exists is described as an example. However, when a grayscale value has eight bits or more, a larger number of grayscales may exist. The minimum grayscale may be the darkest grayscale, and the maximum grayscale may be the brightest grayscale (e.g. a full white).

A maximum luminance value may be a luminance value of light emitted from pixels corresponding to the maximum grayscale. For example, the maximum luminance value may be a luminance value of white color light generated when a pixel of the first color emits light corresponding to the grayscale 255, a pixel of the second color emits light corresponding to the grayscale 255, and a pixel of the third color emits light corresponding to the grayscale 255. The pixel of the first color, the pixel of the second color, and the pixel of the third color constitute one dot. The unit of the luminance value may be nit.

Therefore, the pixels PX may display a partially (spatially) dark or a partially bright image frame, but the maximum brightness of the image frame is limited to the maximum luminance value. The maximum luminance value may be manually set by manipulation of a user with respect to the display device 10, or be automatically set by an algorithm associated with an illumination sensor, etc. The set maximum luminance value is expressed as an input maximum luminance value DBVI. The grayscale voltage generator 15 may be configured to directly receive the input maximum luminance value DVB1 from the external processor, or be configured to receive the input maximum luminance value DVB1 through the timing controller 11.

The maximum luminance value may vary depending on products. However, for example, the maximum value of the maximum luminance value may be 1200 nits, and the minimum value of the maximum luminance value may be 4 nits. When the input maximum luminance value DBVI is changed, the grayscale voltage generator 15 may provide different grayscale values DVs in response to the same gray scale value, and therefore, the light emission luminance of the pixel varies.

The data divider 16 may selectively couple the data output lines DO1, DO2, . . . and data lines DL1, DL2, DL3, DL4, . . . to each other. A number of the data lines DL1, DL2, DL3, DL4, . . . may be greater than that of the data output lines DO1, DO2, . . . . For example, the number of the data lines DL1, DL2, DL3, DL4, . . . may correspond to multiples of the data output lines DO1, DO2, . . . . The data divider 16 may be a kind of demultiplexer. The data lines DL1, DL2, DL3, DL4, . . . may extend in a first direction DR1. The first direction DR1 and the second direction DR2 may be different directions. For example, the first direction DR1 and the second direction DR2 may be orthogonal to each other.

For example, the ratio of the data output lines DO1, DO2, . . . to the data lines DL1, DL2, DL3, DL4, . . . may be 1:2. The data divider 16 may alternately couple the data output lines DO1, DO2, . . . to odd-numbered data lines or even-numbered data lines. For example, the data divider 16 may couple the data output lines DO1, DO2, . . . to first data lines DL1, DL3, . . . during the first period, couple the data output lines DO1, DO2, . . . to second data lines DL2, DL4, . . . during the second period, couple the data output lines DO1, DO2, . . . to the first data lines DL1, DL3, . . . during the third period, and couple the data output lines DO1, DO2, . . . to the second data lines DL2, DL4, . . . during the fourth period.

For example, the ratio of the data output lines DO1, DO2, . . . to the data lines DL1, DL2, DL3, DL4, . . . may be 1:3. This will be described later in detail with reference to FIGS. 13 to 15.

The data compensator 17 may generate grayscale values GVs3 by compensating received grayscale values GVs2 which is received from the data driver 12. The grayscale values GVs2 may be grayscale values before line crosstalk defect is compensated and the grayscale values GVs3 may be grayscale values after line crosstalk defect is compensated.

In this embodiment, when the data compensator 17 compensates the receive grayscale values GVs2 as the compensated grayscale values GVs3, the input maximum luminance value DVB1 may be further used. When the grayscale values GVs2 and the input maximum luminance value DBVI are provided, data voltages of a corresponding image frame can be found, and hence the data compensator 17 can more accurately compensate for the line crosstalk defect. In another embodiment, the data compensator 17 may refer to another value other than the input maximum luminance value DBVI, so that data voltages of a corresponding image frame are found.

The data compensator 17 may compensate grayscale values GVs2 of a current pixel row by using a load difference between a load value of a previous pixel row and a load value of the current pixel row. The data driver 12 may perform digital-analog conversion on the compensated grayscale values GVs3 so that data voltages of the current pixel row are also compensated. In another embodiment, the data compensator 17 may directly compensate for the data voltages of the current pixel row by using the load difference between the load value of the previous pixel row and the load value of the current pixel row.

A pixel row may mean pixels coupled to the same scan line. That is, a previous pixel row may mean pixels coupled to a previous scan line to which a scan signal having a turn-on level is supplied at a previous time. A current pixel row may mean pixels coupled to a current scan line to which a scan signal having a turn-on level is supplied at a current time. The previous time and the current time may be different from each other by one horizontal period. The one horizontal period may be a minimum interval between rising times of scan signals in adjacent scan lines.

For example, the data compensator 17 may compensate for the third data voltages and the fourth data voltages based on a first load difference between the first data voltages and the third data voltages and a second load difference between the second data voltages and the fourth data voltages, respectively.

Figure 2:
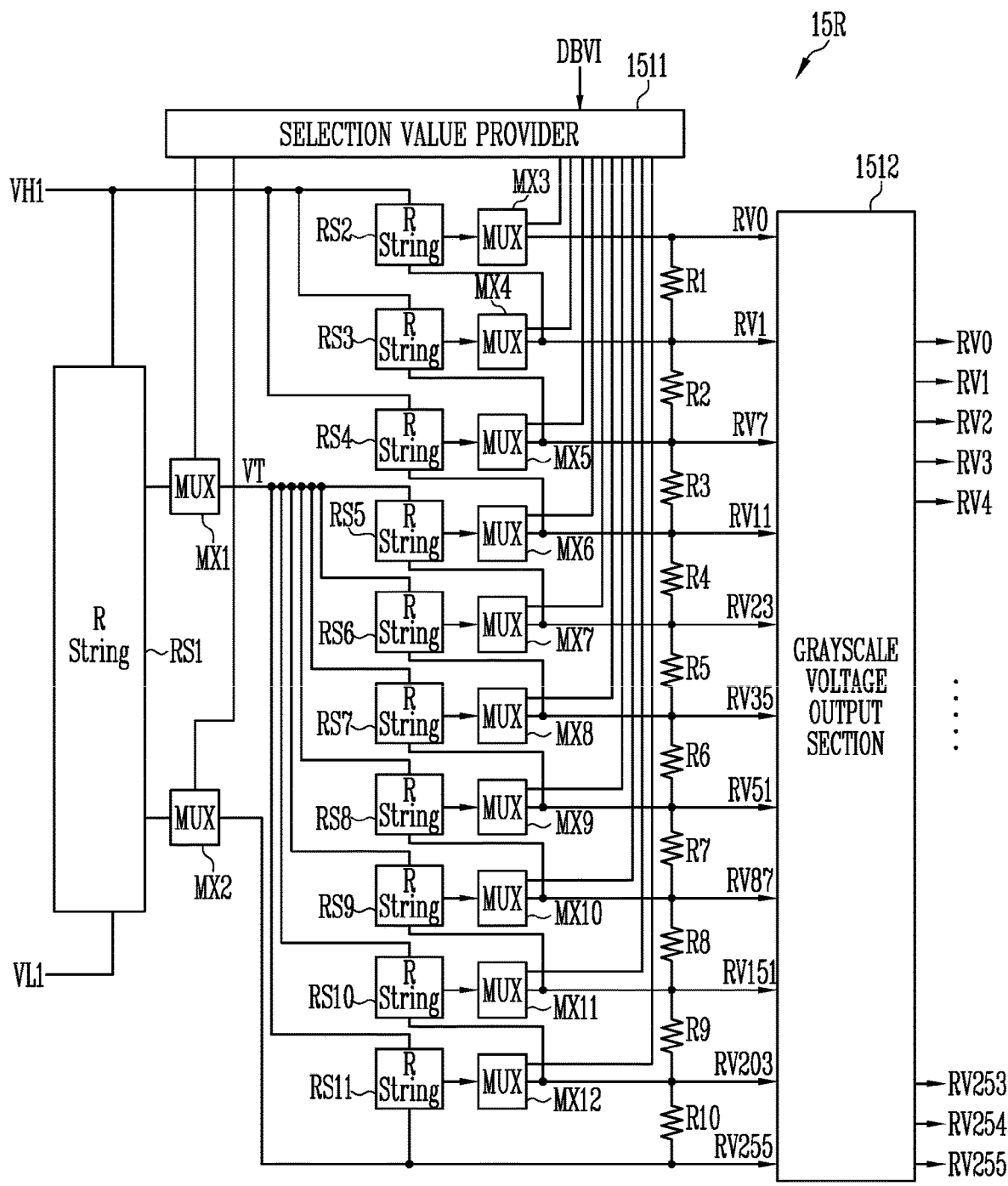
FIGS. 2 and 3 are diagrams illustrating a grayscale voltage generator in accordance with an embodiment of the present disclosure.
Figure 3:
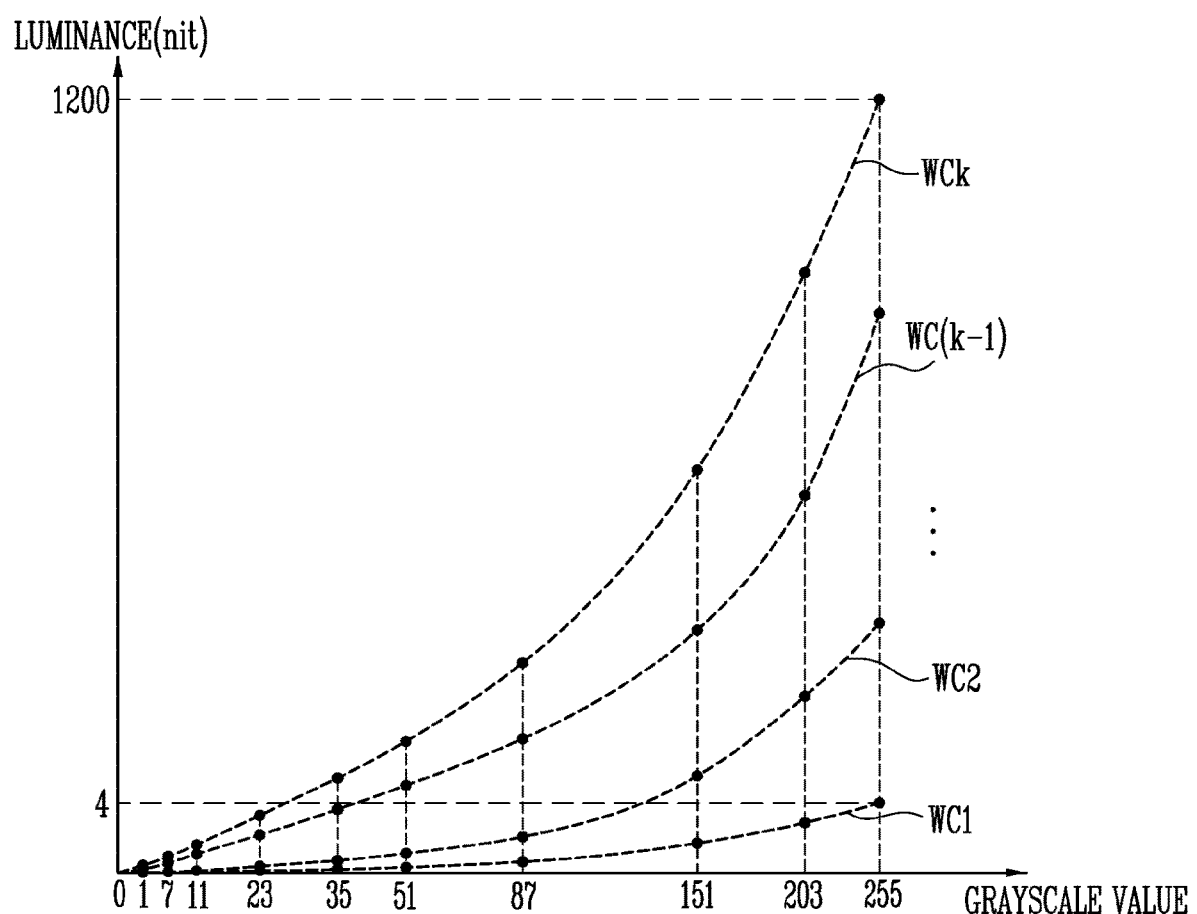

FIGS. 2 and 3 are diagrams illustrating a grayscale voltage generator in accordance with an embodiment of the present disclosure.

For example, when an image frame includes three primary colors (red, green, and blue), it is necessary for the grayscale voltage generator 15 to provide grayscale voltages with respect to each of the three primary colors. The grayscale voltage generator 15 may include a first grayscale voltage generator 15R for a first color, a second grayscale voltage generator (not shown) for a second color, and a third grayscale voltage generator (not shown) for a third color. Hereinafter, the first grayscale voltage generator 15R will be described. The second grayscale voltage generator and the third grayscale voltage generator may substantially have the same configuration with the first grayscale voltage generator 15R, and therefore, overlapping descriptions will be omitted.

Referring to FIG. 2, the first grayscale voltage generator 15R may include a selection value provider 1511, a grayscale voltage output section 1512, resistor strings RS1 to RS11, multiplexers MX1 to MX12, and resistors R1 to R10. The first grayscale voltage generator 15R may generate first grayscale voltages RV0, RV1, RV3, RV4, . . . , RV253, RV254, and RV255.

The selection value provider 1511 may provide selection values to the multiplexers MX1 to MX12 in response to an input maximum luminance value DBVI. The selection values according to the input maximum luminance value DBVI may be pre-stored in a memory device, e.g., a device such as a register in the selection value provider 1511 or connected to the selection value provider 1511.

The resistor string RS1 may generate intermediate voltages between a first high voltage applied to a first high voltage terminal VH1 and a second low voltage applied to a first low voltage terminal VL1. The multiplexer MX1 may output a reference voltage VT by selecting one of the intermediate voltages provided from the resistor string RS1 according to a selection value. The multiplexer MX2 may output a 255-grayscale voltage RV255 by selecting one of the intermediate voltages provided from the resistor string RS1 according to a selection value.

The resistor string RS11 may generate intermediate voltages between the reference voltage VT and the 255-grayscale voltage RV255. The multiplexer MX12 may output a 203-grayscale voltage RV203 by selecting one of the intermediate voltages provided from the resistor string RS11 according to a selection value.

The resistor string RS10 may generate intermediate voltages between the reference voltage VT and the 203-grayscale voltage RV203. The multiplexer MX11 may output a 151-grayscale voltage RV151 by selecting one of the intermediate voltages provided from the resistor string RS10 according to a selection value.

The resistor string RS9 may generate intermediate voltages between the reference voltage VT and the 151-grayscale voltage RV151. The multiplexer MX10 may output an 87-grayscale voltage RV87 by selecting one of the intermediate voltages provided from the resistor string RS9 according to a selection value.

The resistor string RS8 may generate intermediate voltages between the reference voltage VT and the 87-grayscale voltage RV87. The multiplexer MX9 may output a 51-grayscale voltage RV51 by selecting one of the intermediate voltages provided from the resistor string RS8 according to a selection value.

The resistor string RS7 may generate intermediate voltages between the reference voltage VT and the 51-grayscale voltage RV51. The multiplexer MX8 may output a 35-grayscale voltage RV35 by selecting one of the intermediate voltages provided from the resistor string RS7 according to a selection value.

The resistor string RS6 may generate intermediate voltages between the reference voltage VT and the 35-grayscale voltage RV35. The multiplexer MX7 may output a 23-grayscale voltage RV23 by selecting one of the intermediate voltages provided from the resistor string RS6 according to a selection value.

The resistor string RS5 may generate intermediate voltages between the reference voltage VT and the 23-grayscale voltage RV23. The multiplexer MX6 may output an 11-grayscale voltage RV11 by selecting one of the intermediate voltages provided from the resistor string RS5 according to a selection value.

The resistor string RS4 may generate intermediate voltages between the first high voltage and the 11-grayscale voltage RV11. The multiplexer MX5 may output a 7-grayscale voltage RV7 by selecting one of the intermediate voltages provided from the resistor string RS4 according to a selection value.

The resistor string RS3 may generate intermediate voltages between the first high voltage and the 7-grayscale voltage RV7. The multiplexer MX4 may output a 1-grayscale voltage RV1 by selecting one of the intermediate voltages provided from the resistor string RS3 according to a selection value.

The resistor string RS2 may generate intermediate voltages between the first high voltage and the 1-grayscale voltage RV1. The multiplexer MX3 may output a 0-grayscale voltage RV0 by selecting one of the intermediate voltages provided from the resistor string RS2 according to a selection value.

The above-described grayscales 0, 1, 7, 11, 23, 35, 51, 87, 151, 203, and 255 may be referred to as reference grayscales. In addition, the grayscale voltages RV255, RV0, RV1, RV7, RV11, RV23, RV35, RV51, RV87, RV151 and 203 generated from the multiplexers MX2 to MX12 may be referred to as reference grayscale voltages. A number of reference grayscales and grayscale numbers corresponding to the reference grayscales may be differently set depending on products. Hereinafter, for convenience of description, the grayscales 0, 1, 7, 11, 23, 35, 51, 87, 151, 203, and 255 are described as reference grayscales.

The grayscale voltage output section 1512 may generate the first grayscale voltages RV0 to RV255 by dividing the reference grayscale voltages RV0, RV1, RV7, RV11, RV23, RV35, RV51, RV87, RV151, RV203, and RV255. For example, the grayscale voltage output section 1512 may generate the first grayscale voltages RV2 to RV6 by dividing the reference grayscale voltages RV1 and RV7.

Referring to FIG. 3, white color light curves WC1, WC2, . . . , WC(k−1), and WCk of output luminances with respect to grayscale values are illustrated. Here, k may be an integer greater than 0.

Maximum luminance values of the white color light curves WC1 to WCk may be different from one another. For example, a maximum luminance of the white color light curve WC1 (e.g., 4 nits) may be lowest, and a maximum luminance value of the white color light curve WCk (e.g., 1200 nits) may be highest.

In order to generate white light, it is assumed that the pixels PX of all colors receive data voltages having the same grayscale.

Imaginary dots illustrated on the white color light curves WC1 to WCk shown in FIG. 3 may correspond to the selection values pre-stored in the above-described selection value provider 1511. More accurate white color light curves may be directly expressed as a number of selection values increases. However, to increase the number of selection values, physical devices such as multiplexers, registers, etc. which correspond to the increased number of selection values are further required, and therefore, a limitation exists. Accordingly, only the selection values with respect to the above-described reference grayscale voltage may be pre-stored and used, and the other grayscale voltages may be generated by dividing the reference grayscale voltages. In addition, for the same reason, selection values with respect to some maximum luminance values (e.g., reference maximum luminance values) between 4 nits and 1200 nits may be pre-stored and used, and the other maximum luminance values may be generated by interpolating the selection values.

The pre-stored selection values may be set for each individual product through Multi-Time Programming (MTP). That is, selection values may be set and stored as experimental values which are obtained through repetitive measurements to find out conditions in which white color light with a desired luminance can be emitted with respect to grayscale values.

Figure 4:
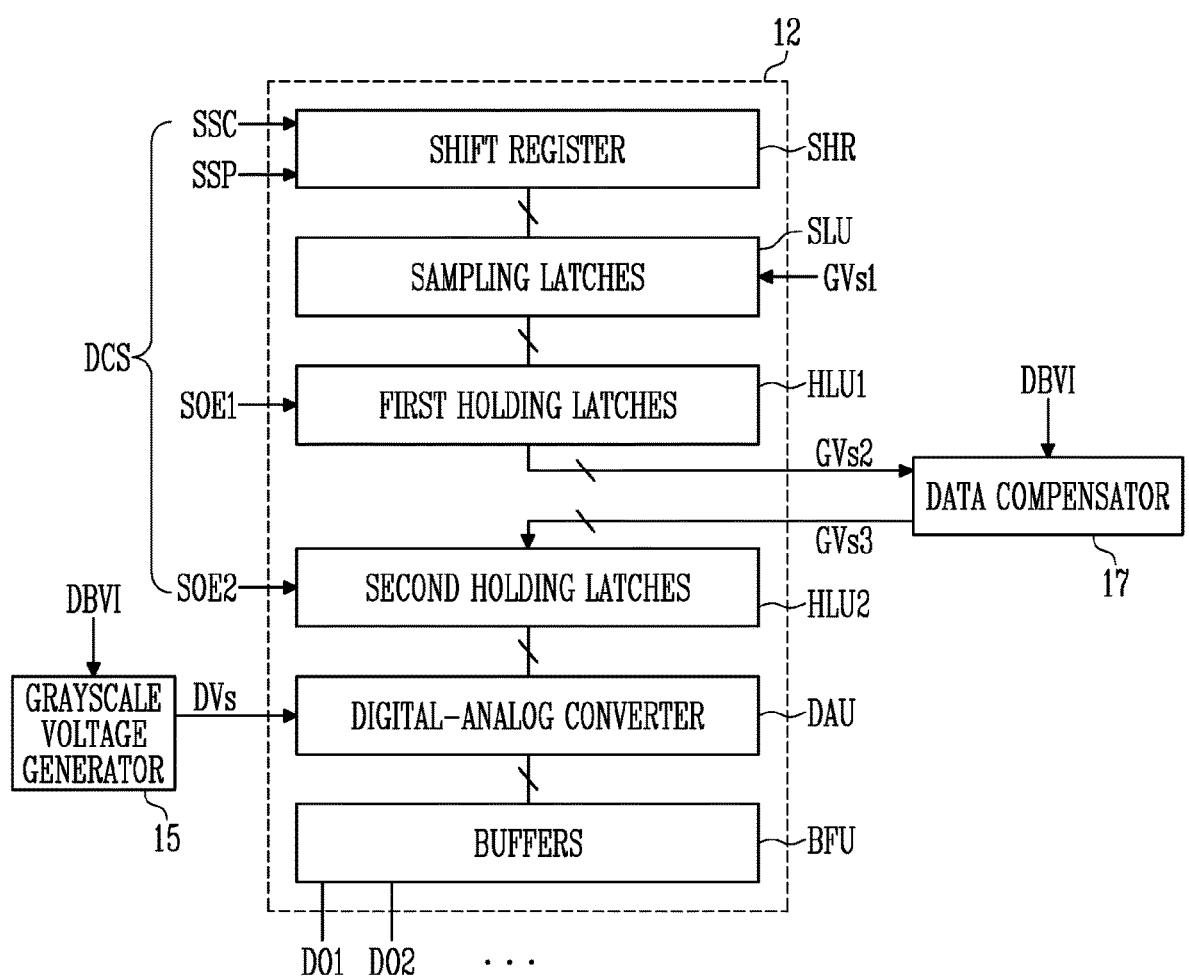
FIG. 4 is a diagram illustrating a data driver in accordance with an embodiment of the present disclosure.

FIG. 4 is a diagram illustrating a data driver in accordance with an embodiment of the present disclosure.

Referring to FIG. 4, the data driver 12 in accordance with the embodiment of the present disclosure may include a shift register SHR, a sampling latches SLU, a first holding latches HLU1, a second holding latches HLU2, a digital-analog converter DAU, and buffers BFU.

A data control signal DCS received from the timing controller 11 may include a source shift clock SSC, a source start pulse SSP, a source output enable signals SOE1 and SOE2, and the like.

The shift register SHR may sequentially generate sampling signals while shifting the source start pulse SSP in response to the source shift clock SSC.

The sampling latches SLU may sequentially receive grayscale values GVs1 for an image frame from the timing controller 11. The sampling latches SLU may store the grayscale values GVs1 sequentially provided from the timing controller 11 in corresponding sampling latches in response to the sampling signals sequentially supplied from the shift register SHR.

The first holding latches HUL1 may receive and store grayscale values GVs1 which are stored in the sampling latches in response to a first source output enable signal SOE1 is input. The data compensator 17 may receive the grayscale values GVs2 output from the first holding latches and the input maximum luminance value DBVI output from the timing controller 11, and output compensated grayscale values GVs3.

The second holding latches HLU2 may store the compensated grayscale values GVs3 output from the data compensator 17 in response to a second source output enable signal SOE2 is input.

The digital-analog converters may perform analog-digital conversion on the grayscale values GVs3 compensated by the data compensator 17 by using grayscale voltages DVs provided from the grayscale voltage generator 15.

Each of the buffers BFU may receive an output of a digital-analog converter DAU as a data voltage and apply the data voltage to a corresponding data output line. For example, each of the buffers may be an operational amplifier. Each of the buffers may be a voltage follower to apply an output of a digital-analog converter as a data voltage to the corresponding data output line.

Figure 5:
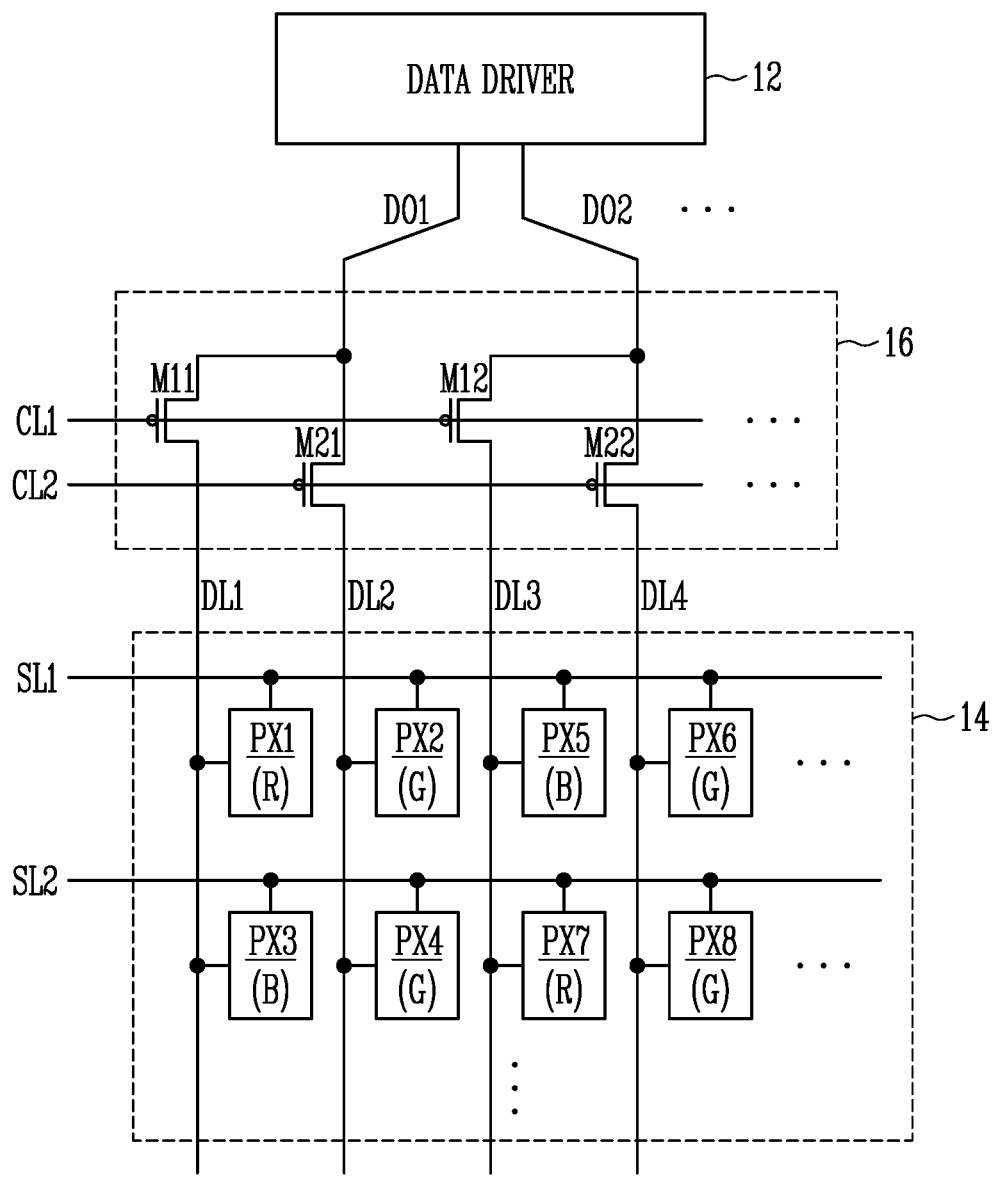
FIGS. 5 and 6 are diagrams illustrating a data divider and pixels in accordance with an embodiment of the present disclosure.
Figure 6:
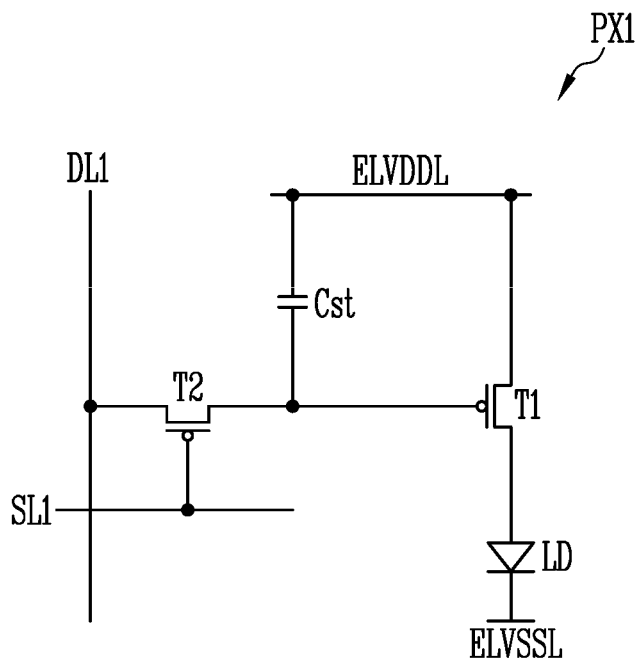

FIGS. 5 and 6 are diagrams illustrating a data divider and pixels in accordance with an embodiment of the present disclosure.

Referring to FIG. 5, the data divider 16 may include first transistors (M11, M12, . . . ) connected to odd numbered data lines and second transistors (M21, M22, . . . ) connected to even numbered data lines. Gate electrodes of the first transistors M11 and M12 may be coupled to a first control line CL1, first electrodes of the first transistors M11 and M12 may be coupled to data output lines DO1 and DO2, respectively, and second electrodes of the first transistors M11 and M12 may be coupled to first data lines (the odd numbered data lines; DL1, DL3, ... ), respectively. Gate electrodes of the second transistors M21 and M22 may be coupled to a second control line CL2, first electrodes of the second transistors M21 and M22 may be coupled to the data output lines DO1 and DO2, respectively, and second electrodes of the second transistors M21 and M22 may be coupled to second data lines (the even numbered data lines; DL2, DL4, ..., respectively. For example, the data divider 16 may be a demultiplexer having a ratio of input to output, which is 1:2.

A turn-on period of the first transistors M11 and M12 and a turn-on period of the second transistors M21 and M22 may not overlap with each other. The timing controller 11 may sequentially provide control signals having a turn-on level to the first and second control lines CL1 and CL2 such that the first transistors M11 and M12 and the second transistors M21 and M22 are sequentially turned on.

For example, a number of the first transistors M11 and M12 and a number of the second transistors M21 and M22 may be the same. In addition, a number of the first data lines DL1, DL3, ... (the odd numbered data lines) and a number of the second data lines DL2, DL4, ... (the even numbered data lines) may be the same. The first data lines DL1 and DL3 and the second data lines DL2 and DL4 may be alternately arranged.

For example, the pixels 14 may include a plurality of pixels PX1, PX2, PX3, PX4, PX5, PX6, PX7, and PX8 arranged in a pentile structure. First pixels PX1, PX2, PX5, and PX6 may be coupled to a first scan line SL1. The first pixels PX1, PX2, PX5, and PX6 may be configured such that red, green, blue, and green are sequentially repeated along an extending direction of the first scan line SL1. The first pixels PX1, PX2, PX5, and PX6 may be coupled to different data lines DL1, DL2, DL3, and DL4.

In addition, second pixels PX3, PX4, PX7, and PX8 may be coupled to a second scan line SL2. The second pixels PX3, PX4, PX7, and PX8 may be configured such that blue, green, red, and green are sequentially repeated along an extending direction of the second scan line SL2. The second pixels PX3, PX4, PX7, and PX8 may be coupled to different data lines DL1, DL2, DL3, and DL4.

Red and blue pixels may be coupled to the first data line DL1 to be sequentially repeated along an extending direction of the first data line DL1. Green pixels may be coupled to the second data lines DL2 and DL4 along an extending direction of the second data lines DL2 and DL4. Blue and red pixels may be coupled to the first data line DL3 to be sequentially repeated along an extending direction of the first data line DL3.

Referring to FIG. 6, an exemplary first pixel PX1 is illustrated. Other pixels PX2 to PX8 may substantially have the same configuration, and therefore, overlapping descriptions will be omitted.

A gate electrode of a transistor T1 may be coupled to a second electrode of a storage capacitor Cst, a first electrode of the first transistor T1 may be coupled to a first power line ELVDDL, and a second electrode of the transistor T1 may be coupled to an anode electrode of the light emitting diode LD. The transistor T1 may be referred to as a driving transistor.

A gate electrode of a second transistor T2 may be coupled to the first scan line SL1, a first electrode of the second transistor T2 may be coupled to the first data line DL1, and a second electrode of the second transistor T2 may be coupled to the second electrode of the storage capacitor Cst. The second transistor T2 may be referred to as a scan transistor.

A first electrode of the storage capacitor Cst may be coupled to the first power line ELVDDL, and the second electrode of the storage capacitor Cst may be coupled to the gate electrode of the transistor T1.

The anode of the light emitting diode LD may be coupled to the second electrode of the transistor T1, and a cathode of the light emitting diode LD may be coupled to a second power line ELVSSL.

During an emission period of the light emitting diode LD, a first power voltage applied to the first power line ELVDDL may be higher than a second power voltage applied to the second power line ELVSSL.

Although the transistors T1, T2, M11, M12, M21, and M22 are implemented with a P-type transistor, those skilled in the art may replace at least one transistor with an N-type transistor by inverting the phase of a signal.

Figure 7:
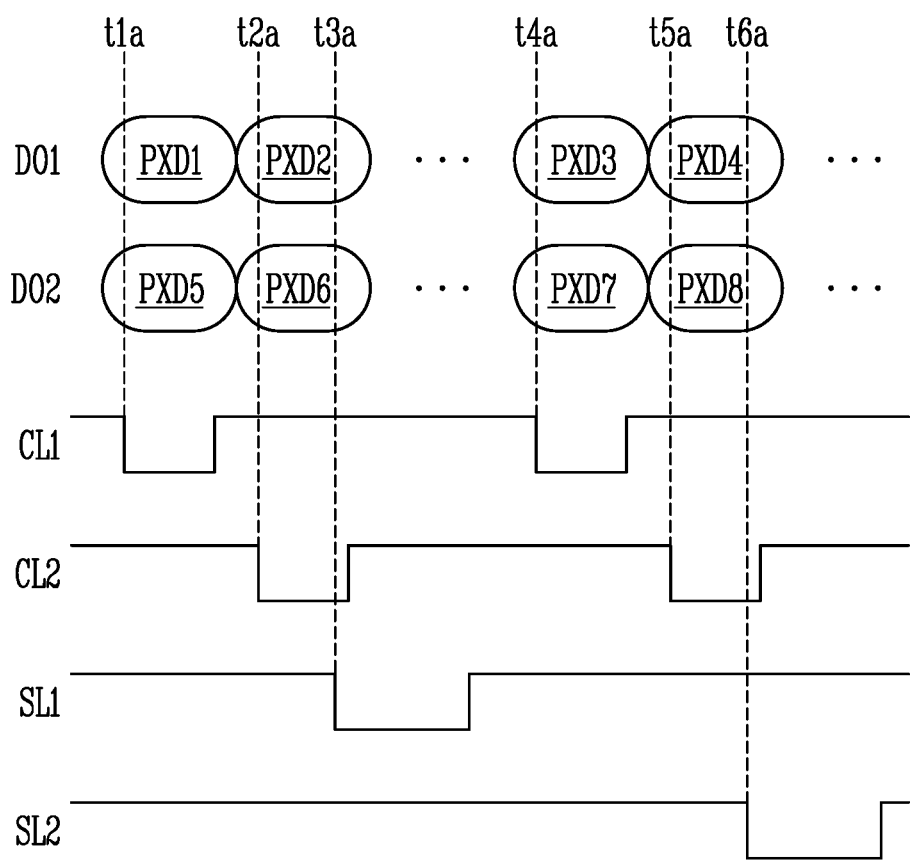
FIG. 7 is a diagram illustrating a driving method of the display device in accordance with an embodiment of the present disclosure.

FIG. 7 is a diagram illustrating a driving method of the display device in accordance with an embodiment of the present disclosure.

First, at a time t1a, a first control signal having a turn-on level (low level) may be applied to the first control line CL1. Accordingly, the first transistors M11 and M12 are turned on, a first data output line DO1 and the first data line DL1 are coupled to each other, and a second data output line DO2 and the first data line DL3 are coupled to each other. The data driver 12 may output a first data voltage PXD1 to the first data output line DO1, and output a first data voltage PXD5 to the first data output line DO2. Therefore, the first data line DL1 may be charged with the first data voltage PXD1, and the first data line DL3 may be charged with the first data voltage PXD5. A period from the time t1a to a time at which the first control signal having a turn-off level is applied may be referred to as a first period.

Next, at time t2a, a second control signal having a turn-on level may be applied to the second control line CL2. Accordingly, the second transistors M21 and M22 are turned on, the first data output line DO1 and the second data line DL2 are coupled to each other, and the second data output line DO2 and the second data line DL4 are coupled to each other. The second data line DL2 may be charged with a second data voltage PXD2, and the second data line DL4 may be charged with a second data voltage PXD6. A period from the time t2a to a time at which the second control signal having a turn-off level is applied may be referred to as a second period.

Next, at a time t3a, a first scan signal having a turn-on level may be applied to the first scan line SL1. Accordingly, the first pixels PX1, PX2, PX5, and PX6 may receive data voltages charged in the first data lines DL1 and DL3 and the second data lines DL2 and DL4. In this embodiment, the time t3a may overlap with the second period.

Next, at a time t4a, a first control signal having a turn-on level may be applied to the first control line CL1. Accordingly, the first transistors M11 and M12 are turned on, the first data output line DO1 and the first data line DL1 are coupled to each other, and the second data output line DO2 and the first data line DL3 are coupled to each other. The first data line DL1 may be charged with a third data voltage PXD3, and the first data line DL3 may be charged with a third data voltage PXD7. A period from the time t4a to a time at which the first control signal having a turn-off level is applied may be referred to as a third period.

Next, at a time t5a, a second control having a turn-on level may be applied to the second control line CL2. Accordingly, the second transistors M21 and M22 are turned on, the first data output line DO1 and the second data line DL2 are coupled to each other, and the second data output line DO2 and the second data line DL4 are coupled to each other. The second data line DL2 may be charged with a fourth data voltage PXD4, and the second data line DL4 may be charged with a fourth data voltage PXD8. A period from the time t5a to a time at which the second control signal having a turn-off level is applied may be referred to a fourth period.

Next, at a time t6a, a first scan signal having a turn-on level may be applied to the second scan line SL2. Accordingly, the second pixels PX3, PX4, PX7, and PX8 may receive data voltages charged in the first data lines DL1 and DL2 and the second data lines DL2 and DL4. In this embodiment, the time t6a may overlap with the fourth period.

FIGS. 8 to 11 are diagrams illustrating a line crosstalk defect which may occur when the data divider is used.

For example, pixels coupled with a first scan line to a (p−1)th scan line SL(p−1) may receive data voltages corresponding to 128 grayscales. In a next scan period, some of pixels coupled to a pth scan line SLp may receive data voltages corresponding to 128 grayscales, and the others of the pixels may receive data voltages corresponding to 0 grayscale.

Figure 8:
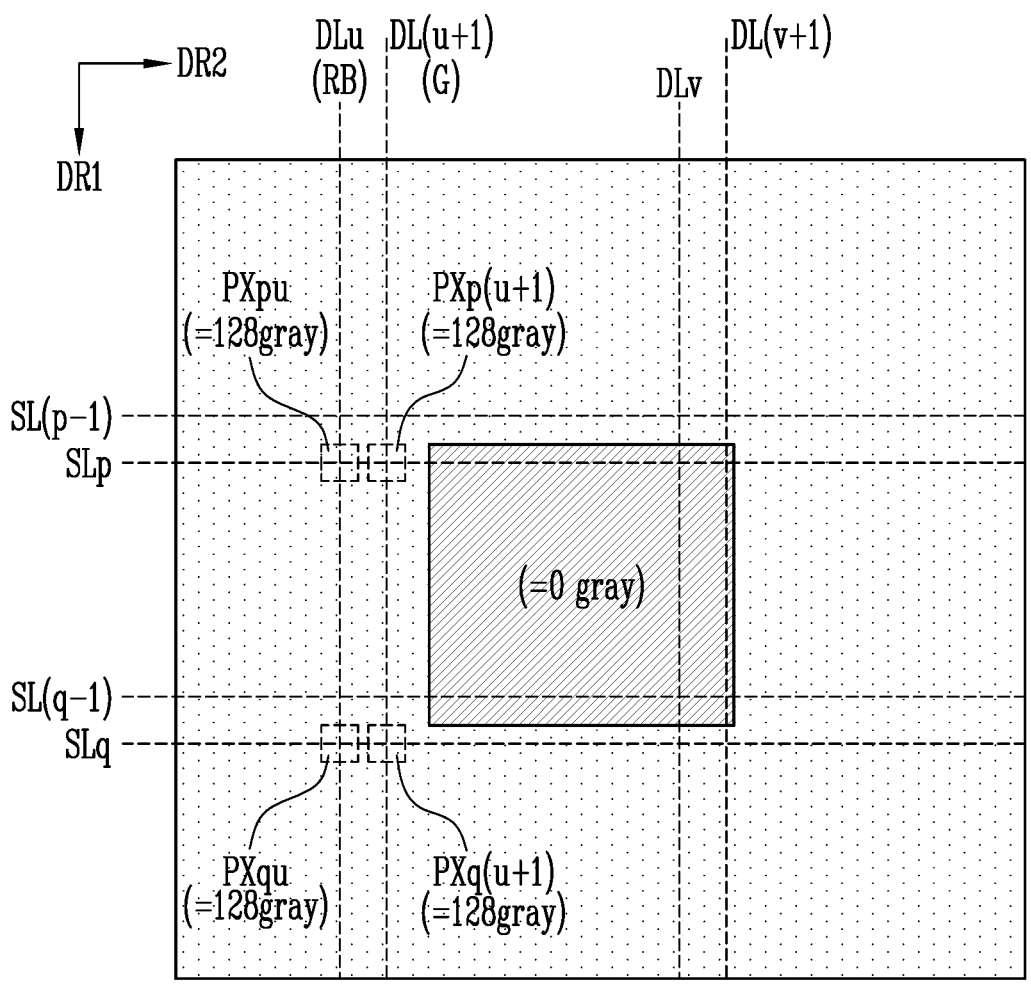
FIGS. 8, 9, 10 and 11 are diagrams illustrating a line crosstalk defect which may occur when the data divider is used.

In an ideal case as shown in FIG. 8, a pixel PXpu coupled to the scan line SLp and a data line DLu may emit light of 128 grayscale. In addition, a pixel PXp(u+1) coupled to the scan line SLp and a data line DL(u+1) may emit light of 128 grayscale. For example, the pixel PXpu may be a red or blue pixel. For example, the pixel PXp(u+1) may be a green pixel. Here, each of p and u is an integer greater than 0.

Figure 9:
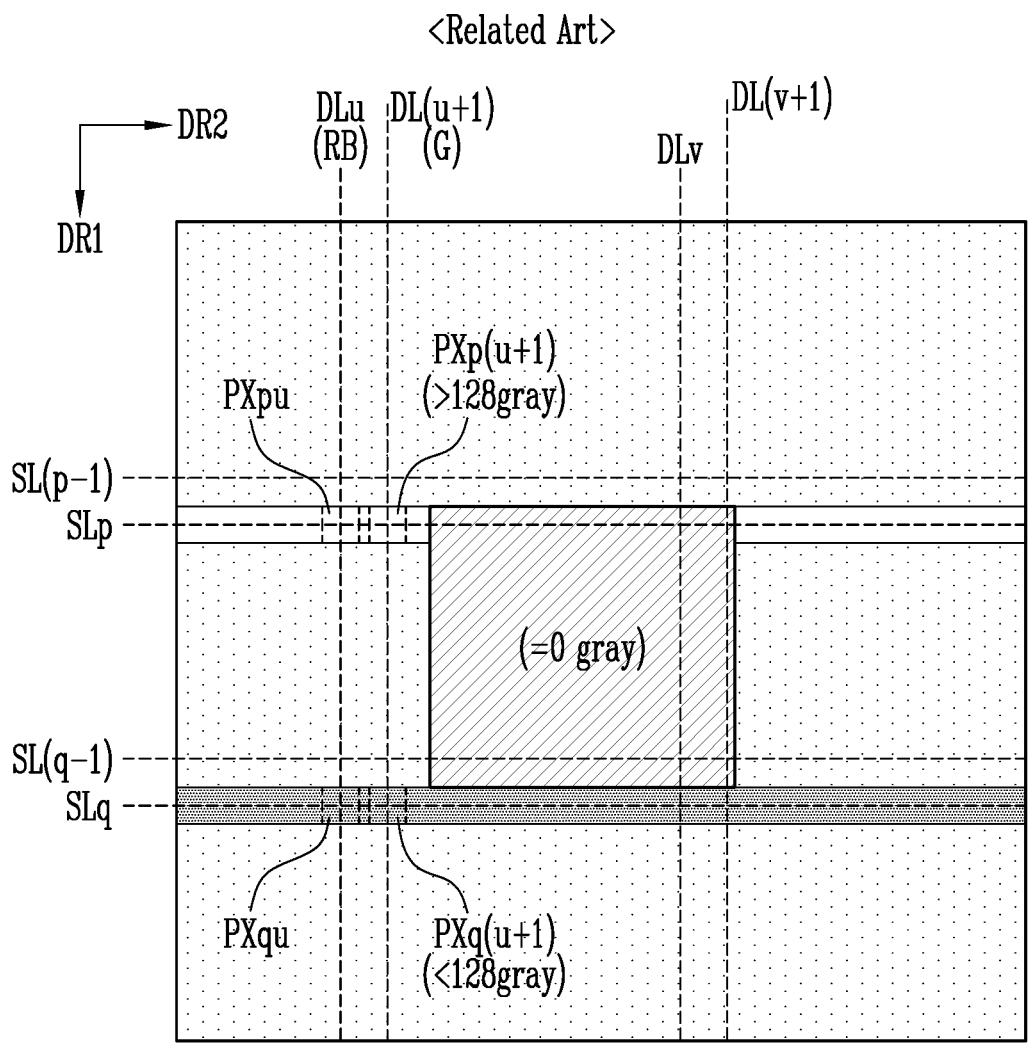

However, when data compensation is not performed, the pixel PXp(u+1) emits light of a grayscale higher than 128 grayscales as shown in FIG. 9, and therefore, a greenish bright line may be generated. A grayscale change of the pixel PXpu may be smaller than that of the pixel PXp(u+1). The bright line may result from a line crosstalk defect caused by data lines DLv and DL(v+1) in which a data voltage is suddenly changed from 128 grayscale to 0 grayscale. Here, v may be an integer greater than 0.

For example, pixels coupled to a (q−1)th scan line SL(q−1) may receive data voltages corresponding to 128 grayscale or data voltages corresponding to 0 grayscale. In a next scan period, pixels coupled to a qth scan line SLq may all receive data voltages corresponding to 128 grayscales.

In an ideal case as shown in FIG. 8, a pixel PXqu coupled to a scan line SLq and the data line DLu may emit light of 128 grayscale. In addition, a pixel PXq(u+1) coupled to the scan line SLq and the data line DL(u+1) may emit light of 128 grayscale. Here, q is an integer greater than 0.

However, when data compensation is not performed, the pixel PXq(u+1) emits light of a grayscale lower than 128 grayscales as shown in FIG. 9, and therefore, a dark line may be generated. A grayscale change of the pixel PXqu may be smaller than that of the pixel PXq(u+1). The dark line may result from a line crosstalk defect caused by the data lines DLv and DL(v+1) in which a data voltage is suddenly changed from 0 grayscale to 128 grayscales.

Figure 10:
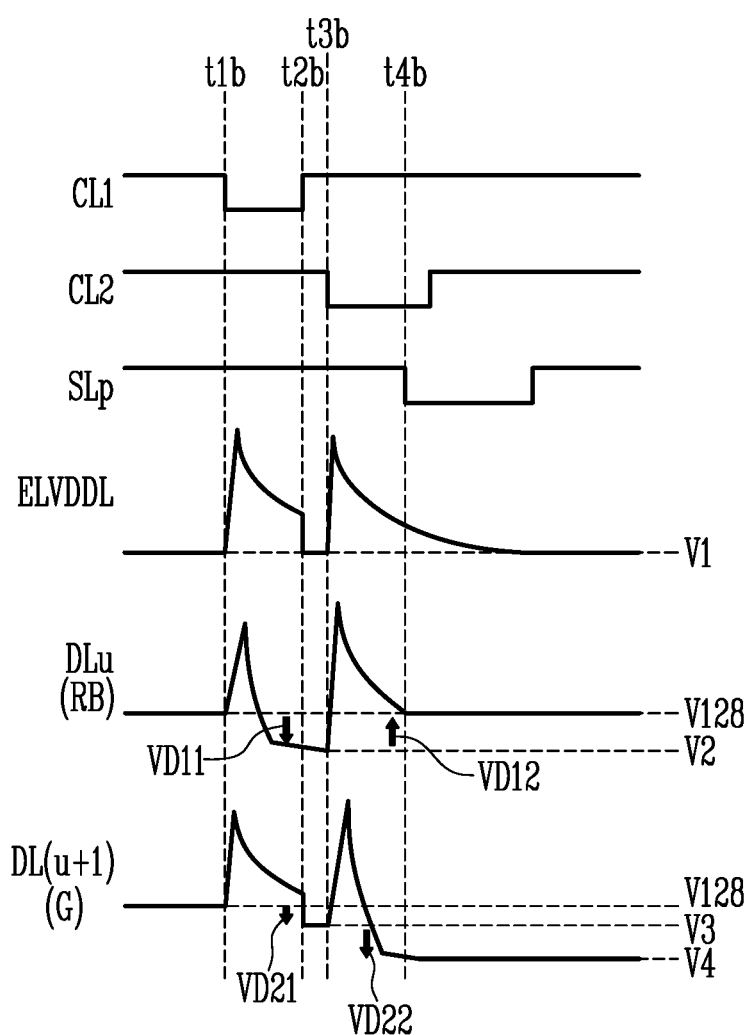
Figure 11:
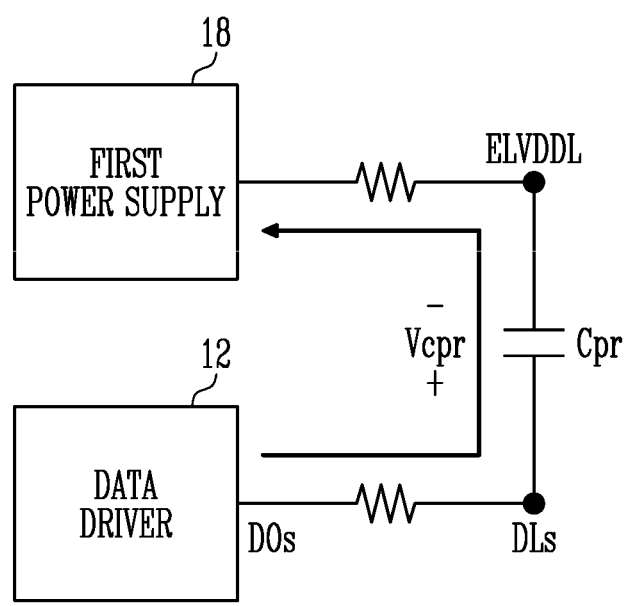

Referring to FIGS. 10 and 11, a cause of the line crosstalk defect will be described in detail.

Referring to FIG. 10, a cause that a greenish bright line is generated in the pixels coupled to the pth scan line SLp after the reception of data voltages of pixels coupled to the (p−1)th scan line SL(p−1) is ended will be described.

First, a time t1b, a first control signal having a turn-on level may be supplied to the first control line CL1. A data voltage applied to the with data line DLv may be suddenly increased (changed from 128 grayscale to 0 grayscale).

Referring to FIG. 11, a parasitic capacitance Cpr may be formed between the first power line ELVDDL and data lines DLs. The first power line ELVDDL may be commonly coupled to all the pixels PX. Therefore, instantaneous voltage fluctuation of the first power line ELVDDL may have influence on all the data lines DLs.

When a data voltage of the data line DLv is suddenly increased, the first power voltage of the first power line ELVDDL may be instantaneously increased, while a parasitic current is flowing from the data driver 12 to a first power supply 18. Data voltages of the data lines DLu and DL(u+1) may also be instantaneously increased by coupling of the parasitic capacitance Cpr.

The data line DLu may be in a state in which it is coupled to a data output line, and the data line DL(u+1) may be in a floating state in which it is not coupled to the data output line. Therefore, a data voltage of the data line DLu may be rapidly stabilized (decreased) to a voltage V128 corresponding to 128 grayscales. Since the data line DL(u+1) is in the floating state, a wavelength of a data voltage of the data line DL(u+1) may be similar to that of the first power voltage.

The first power supply 18 may be a DC-DC converter which supplies the first power voltage to the first power line ELVDDL. Since the first power supply 18 includes a feedback circuit, the first power supply 18 may maintain the first power voltage as a voltage V1. Therefore, the first power voltage may be stabilized (decreased) to the voltage V1 at a time t2b. That the first power voltage is suddenly changed at the time t2b may result from that the first control signal having a turn-off level is supplied.

At the time t2b, the data voltages of the data lines DLu and DL(u+1) may be smaller than the voltage V128 corresponding to grayscale 128. This results from that a voltage Vcpr charged in the parasitic capacitance Cpr increases by the parasitic current. Due to influence of the data driver 12, a voltage decrease width VD11 of the data line DLu may be greater than width VD21 of the data line DL(u+1).

At a time t3b, a second control signal having a turn-on level may be supplied to the second control line CL2. A data voltage applied to the (v+1)th data line DL(v+1) may be suddenly increased (changed from 128 grayscale 128 to 0 grayscale).

When the data voltage of the data line DL(v+1) is rapidly increased, the first power voltage of the first power line ELVDDL may be instantaneously increased, while a parasitic current is flowing from the data driver 12 to a first power supply 18. Data voltages of the data lines DLu and DL(u+1) may also be instantaneously increased by coupling of the parasitic capacitance Cpr.

The data line DLu may be in a floating state in which it is not coupled to the data output line, and the data line DL(u+1) may be in a state in which it is coupled to the data output line. Therefore, a data voltage of the data line DL(u+1) may be rapidly stabilized (decreased) to a voltage V128 corresponding to 128 grayscales. Since the data line DLu is in the floating state, waveform of a data voltage of the data line DLu may be similar to waveform of the first power voltage.

Although the second control signal having a turn-off level is supplied, unlike the time t2b, the first power voltage may not be rapidly changed. This results from that a scan signal having a turn-on level is supplied to the scan line SLp at a time t4b before the second control signal having the turn-off level is supplied. The data lines DLu and DL(u+1) are respectively coupled to the pixels PXpu and PXp(u+1) by the scan signal having the turn-off level, and therefore, the first power voltage is not rapidly decreased.

Accordingly, at the time t4b, the data voltage of the data line DLu may be similar to a voltage V128 corresponding to 128 grayscales. That is, with reference to the time t2b, a voltage increase width VD12 at the time t4b may be mostly cancelled by the voltage decrease width VD11.

On the other hand, with reference to the time t2b, the data voltage of the data line DL(u+1) decreases by a voltage decrease width VD22 at the time t4b, and therefore, may become a voltage V4 lower than a voltage V3.

Consequently, at time t4b, the pixel PXpu may receive a voltage V128 corresponding to 128 grayscales, and the pixel PXp(u+1) may receive a voltage V4 corresponding to a grayscale higher than 128 grayscales. Therefore, a greenish bright line as a color of the pixel PXp(u+1) may be generated.

Figure 12:
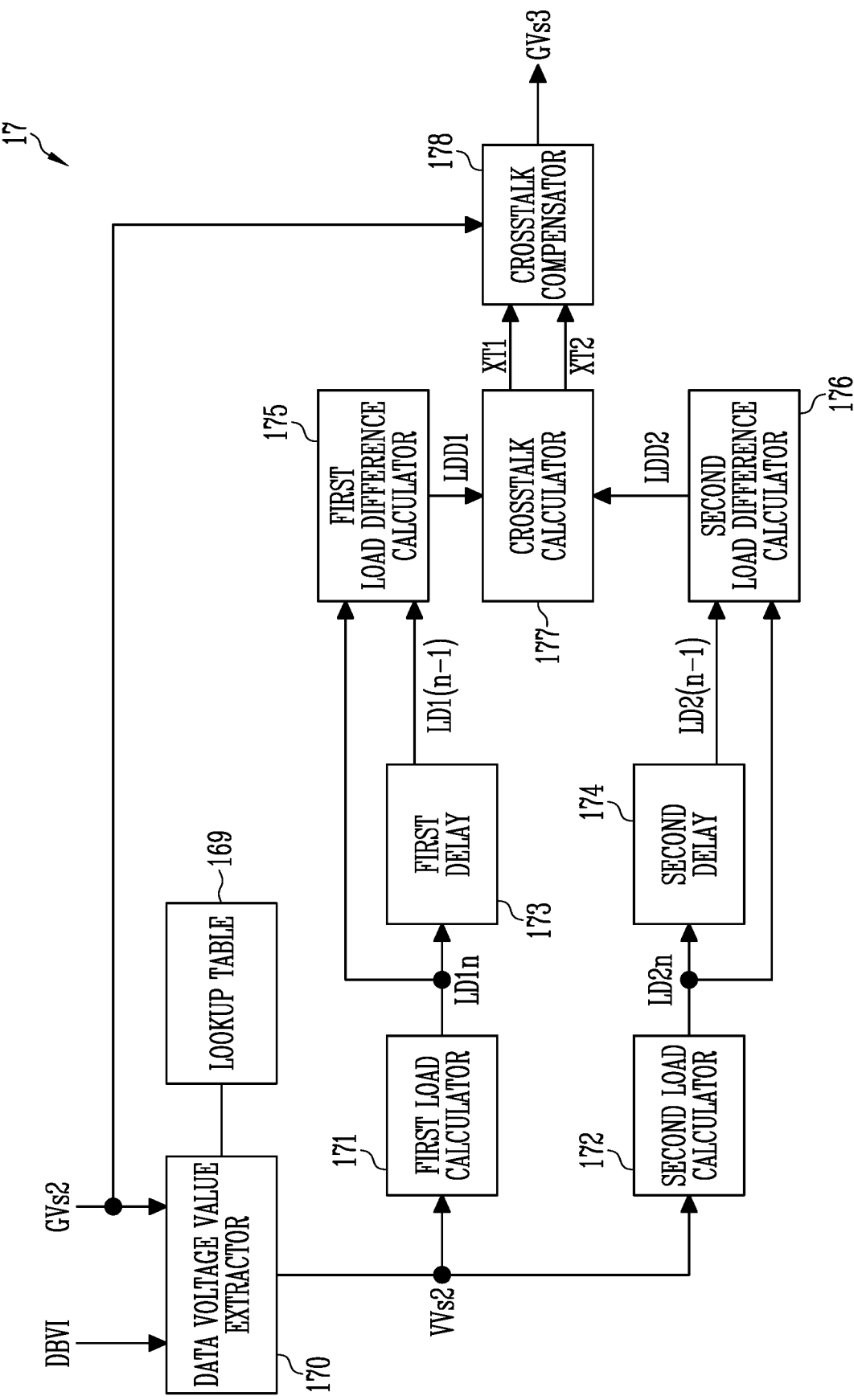
FIG. 12 is a diagram illustrating a data compensator in accordance with an embodiment of the present disclosure.

FIG. 12 is a diagram illustrating a data compensator in accordance with an embodiment of the present disclosure.

The data compensator 17 in accordance with the embodiment of the present disclosure may include a lookup table 169, a data voltage value extractor 170, a first load calculator 171, a second load calculator 172, a first delay 173, a second delay 174, a first load difference calculator 175, a second load difference calculator 176, a crosstalk calculator 177, and a crosstalk compensator 178.

The data compensator 17 may compensate the third data voltages PXD3 and PXD7 and the fourth data voltages PXD4 and PXD8 based on a first load difference LDD1 between the first data voltages PXD1 and PXD5 and the third data voltages PXD3 and PXD7 and a second load difference LDD2 between the second data voltages PXD2 and PXD6 and the fourth data voltages PXD4 and PXD8.

The lookup table 169 may pre-store data voltage values corresponding to input maximum luminance values and grayscale values. The lookup table 169 may be a separate memory device or exist in a portion of another memory device as a data.

The data voltage value extractor 170 may receive an input maximum luminance value DVB1 from the timing controller 11 and grayscale values GVs2 from the data driver 12, and extract data voltage values VVs2 corresponding to the input maximum luminance value DBVI and the grayscale values GVs2 from the lookup table 169. As described above, the grayscale voltage generator 15 may output various grayscale voltages VDs, for example, first grayscale voltages RV0, RV1, RV3, RV4, . . . , RV253, RV254, and RV255, with respect to each grayscale according to the input maximum luminance value DBVI. Thus, in this embodiment, crosstalk is compensated based on the data voltage values VVs2 so that the compensation of the crosstalk can be performed more accurately than a case where the crosstalk is compensated based on the grayscale values GVs2.

The first load calculator 171 may calculate a load value by using some of the data voltage values VVs2. For example, the first load calculator 171 may calculate a load value by adding up data voltage values corresponding to data voltages supplied to the first data lines DL1 and DL3 among the data voltage values VVs2.

Since the data voltage values VVs2 are sequentially supplied in units of pixel rows, the first load calculator 171 may sequentially calculate and output load values. Referring to FIG. 7, the first load calculator 171 may calculate and output a load value of the first data voltages PXD1 and PXD5 first. Next, the first load calculator 171 may calculate and output a load value of the third data voltages PXD3 and PXD7. That is, the first load calculator 171 may sequentially output the load value of the first data voltages PXD1 and PXD5, and the load value of the third data voltages PXD3 and PXD7.

The second load calculator 172 may calculate a load value by using some of the data voltage values VVs2. For example, the second load calculator 172 may calculate a load value by adding up data voltage values corresponding to data voltages supplied to the second data lines DL2 and DL4 among the data voltage values VVs2.

Since the data voltage values VVs2 are sequentially supplied in units of pixel rows, the second load calculator 172 may sequentially calculate and output load values. Referring to FIG. 7, the second load calculator 172 may calculate and output a load value of the second data voltages PXD2 and PXD6 first. Next, the second load calculator 172 may calculate and output a load value of the fourth data voltages PXD4 and PXD8. That is, the second load calculator 172 may sequentially output the load value of the second data voltages PXD2 and PXD6, and the load value of the fourth data voltages PXD4 and PXD8.

In an embodiment, each of the load values output from the first load calculator 171 and the second load calculator 172 may be Most Significant Bits (MSB) of a value obtained by adding up data voltage values. That is, only some bits corresponding to the MSB containing the largest amount of information are transferred, so that the capacity (bit number) of a register, which the first delay 173 and the second delay 174 require, can be minimized.

The first delay 173 may output the load value of the first data voltages PXD1 and PXD5 after a predetermined delay time. For example, the first delay 173 may be configured as a delay register. The capacity of the register may correspond to a bit number of the load value. The predetermined delay time may be one horizontal period.

The second delay 174 may output the load value of the second data voltages PXD2 and PXD6 after the predetermined delay time. For example, the second delay 174 may be configured as a delay register. The capacity of the register may correspond to a bit number of the load value. The predetermined delay time may be one horizontal period.

The first load difference calculator 175 may output a first load difference LDD1 based on an output LD1n of the first load calculator 171 and an output LD1(n−1) of the first delay 173. For example, the output LD1n of the first load calculator 171 may be the load value of the third data voltages PXD3 and PXD7. The output LD1(n−1) of the first delay 173 may be the load value of the first data voltages PXD1 and PXD5. Therefore, the first load difference calculator 175 may calculate the first load difference LDD1 between the first data voltages PXD1 and PXD5 and the third data voltage PXD3 and PXD7.

The second load difference calculator 176 may output a second load difference LDD2 based on an output LD2n of the second load calculator 172 and an output LD2(n−1) of the second delay 174. For example, the output LD2n of the second load calculator 172 may be the load value of the fourth data voltages PXD4 and PXD8. The output LD2(n−1) of the second delay 174 may be the load value of the second data voltages PXD2 and PXD6. Therefore, the second load difference calculator 176 may calculate the second load difference LDD2 between the second data voltages PXD2 and PXD6 and the fourth data voltage PXD4 and PXD8.

The crosstalk calculator 177 may calculate a first crosstalk amount XT1 with respect to the third data voltages PXD3 and PXD7 and a second crosstalk amount XT2 with respect to the fourth data voltages PXD4 and PXD8 based on the first load difference LDD1 and the second load difference LDD2. For example, the first crosstalk amount XT1 and the second crosstalk amount XT2 may be calculated as shown in the following Equation 1.

$$\begin{bmatrix} XT1 \\ XT2 \end{bmatrix} = \begin{bmatrix} C11 & C12 \\ C21 & C22 \end{bmatrix} \begin{bmatrix} LDD1 \\ LDD2 \end{bmatrix}$$ Equation 1

C11 may be a first weight value, C12 may be a second weight value, C21 may be a third weight value, and C22 may be a fourth weight value.

For example, the first crosstalk amount XT1 may be a value obtained by adding up a first load difference LDD1 to which the first weight value C11 is applied and a second load difference LDD2 to which the second weight value C12 is applied. In addition, the second crosstalk amount XT2 may be a value obtained by adding up a first load difference LDD1 to which the third weight value C21 is applied and a second load difference LDD2 to which the fourth weight value C22 is applied.

A sign of each of the first weight value C11, the third weight value C21, and the fourth weight value C22 may be different from that of the second weight value C12. For example, each of the first weight value C11, the third weight value C21, and the fourth weight value C22 may be a positive number, and the second weight value C12 may be a negative number. For example, a magnitude and a sign of the first weight value C11 may be predetermined based on the voltage decrease width VD11 shown in FIG. 10, a magnitude and a sign of the second weight value C12 may be predetermined based on the voltage increase width VD12 shown in FIG. 10, a magnitude and a sign of the third weight value C21 may be predetermined based on the voltage decrease width VD21 shown in FIG. 10, and a magnitude and sign of the fourth weight value C22 may be predetermined based on the voltage decrease width VD22 shown in FIG. 10.

The crosstalk compensator 178 may compensate the third data voltages PXD3 and PXD7 based on the first crosstalk amount XT1, and compensate for the fourth data PXD4 and PXD8 based on the second crosstalk amount XT2. A grayscale value GVs3 output from the crosstalk compensator 178 may include the compensated third data voltages PXD3 and PXD7 and the compensated fourth data voltages PXD4 and PXD8.

For example, the crosstalk compensator 178 may increase the third data voltages PXD3 and PXD7 as the first crosstalk amount XT1 increases, and increase the fourth data voltages PXD4 and PXD8 as the second crosstalk amount increases.

For example, in the case shown in FIG. 10, the first crosstalk amount XT1 may be relatively small, and the second crosstalk amount XT2 may be relatively large. Thus, the crosstalk compensator 178 can suppress a greenish component of a bright line by increasing the fourth data voltages PXD4 and PXD8.

Accordingly, the display device 10 in accordance with the present disclosure can minimize a line crosstalk defect which may occur when the data divider 16 is used.

Figure 13:
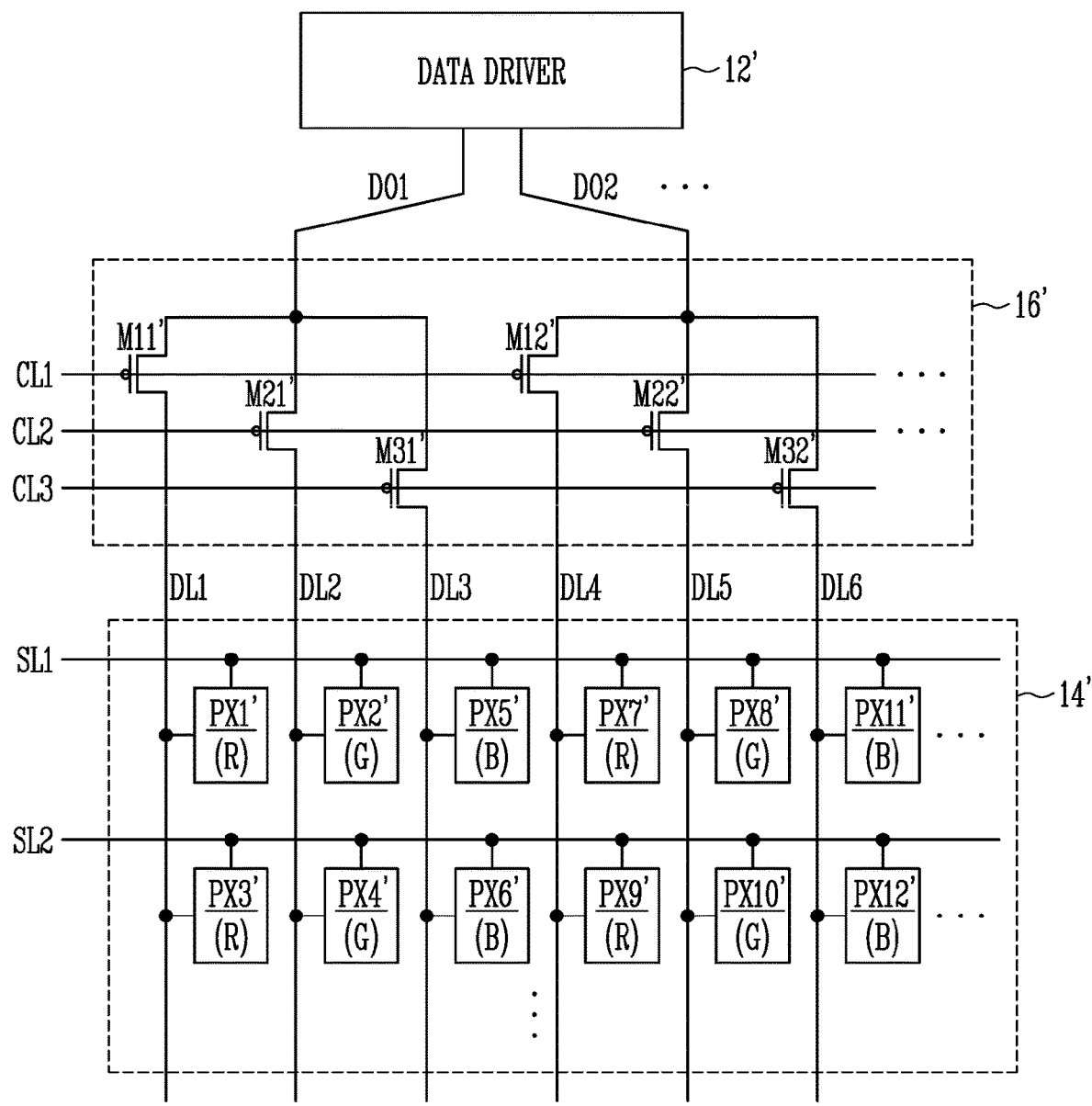
FIG. 13 is a diagram illustrating a data divider and pixels in accordance with another embodiment of the present disclosure.

FIG. 13 is a diagram illustrating a data divider and pixels in accordance with another embodiment of the present disclosure.

Referring to FIG. 13, the data divider 16' may include first transistors M11' and M12', second transistors M21' and M22', and third transistors M31' and M32'. Gate electrodes of the first transistors M11' and M12' may be coupled to a first control line CL1, first electrodes of the first transistors M11' and M12' may be coupled to data output lines DO1 and DO2, and second electrodes of the first transistors M11' and M12' may be coupled to first data lines DL1 and DL4. Gate electrodes of the second transistors M21' and M22' may be coupled to a second control line CL2, first electrodes of the second transistors M21' and M22' may be coupled to the data output lines DO1 and DO2, and second electrodes of the second transistors M21' and M22' may be coupled to second data lines DL2 and DL5. Gate electrodes of the third transistors M31' and M32' may be coupled to a third control line CL3, first electrodes of the third transistors M31' and M32' may be coupled to the data output lines DO1 and D02, and second electrodes of the third transistors M31' and M32' may be coupled to third data lines DL3 and DL6. For example, the data divider 16' may be a demultiplexer having a ratio of input to output, which is 1:3.

A turn-on period of the first transistors M11' and M12', a turn-on period of the second transistors M21' and M22', and a turn-on period of the third transistors M31' and M32' may not overlap with one another. The timing controller 11 may provide control signals having a turn-on level to the first control line CL1, the second control line, and the third control lines CL3 such that the first transistors M11' and M12', the second transistors M21' and M22', and the third transistors M31' and M32' are sequentially turned on.

For example, a number of the first transistors M11' and M12', a number of the second transistors M21' and M22', and a number of the third transistors M31' and M32' may be the same. In addition, a number of the first data lines DL1 and DL4, a number of the second data lines DL2 and DL5, and a number of the third data lines DL3 and DL6 may be the same. The first data lines DL1 and DL4, the second data lines DL2 and DL5, and the third data lines DL3 and DL6 may be sequentially arranged.

For example, the pixels 14' may include pixels PX1', PX2', PX3', PX4', PX5', PX6', PX7', PX8', PX9', PX10', PX11', and PX12' arranged in an RGB stripe structure. First pixels PX1', PX2', PX5', PX7', PX8', and PX11' may be coupled to a first scan line SL1. The first pixels PX1', PX2', PX5', PX7', PX8', and PX11' may be configured such that red, green, and blue are sequentially repeated along an extending direction of the first scan line SL1. The first pixels PX1', PX2', PX5', PX7', PX8', and PX11' may be coupled to different data lines DL1, DL2, DL3, DL4, DL5, and DL6, respectively.

In addition, second pixels PX3', PX4', PX6', PX9', PX10', and PX12' may be coupled to a second scan line SL2. The second pixels PX3', PX4', PX6', PX9', PX10', and PX12' may be configured such that red, green, and blue are sequentially repeated along an extending direction of the second scan line SL2. The second pixels PX3', PX4', PX6', PX9', PX10', and PX12' may be coupled to different data lines DL1 to DL6, respectively.

Red pixels may be coupled to the first data lines DL1 and DL4 to be sequentially repeated along an extending direction of the first data lines DL1 and DL4. Green pixels may be couple to the second data lines DL2 and DL5 to be sequentially repeated along an extending direction of the second data lines DL2 and DL5. Blue pixels may be coupled to the third data lines DL3 and DL6 to be sequentially repeated along an extending direction of the third data lines DL3 and DL6.

A configuration of each of the pixels PX1' to PX12' may be identical to that shown in FIG. 6, and therefore, overlapping descriptions will be omitted.

Figure 14:
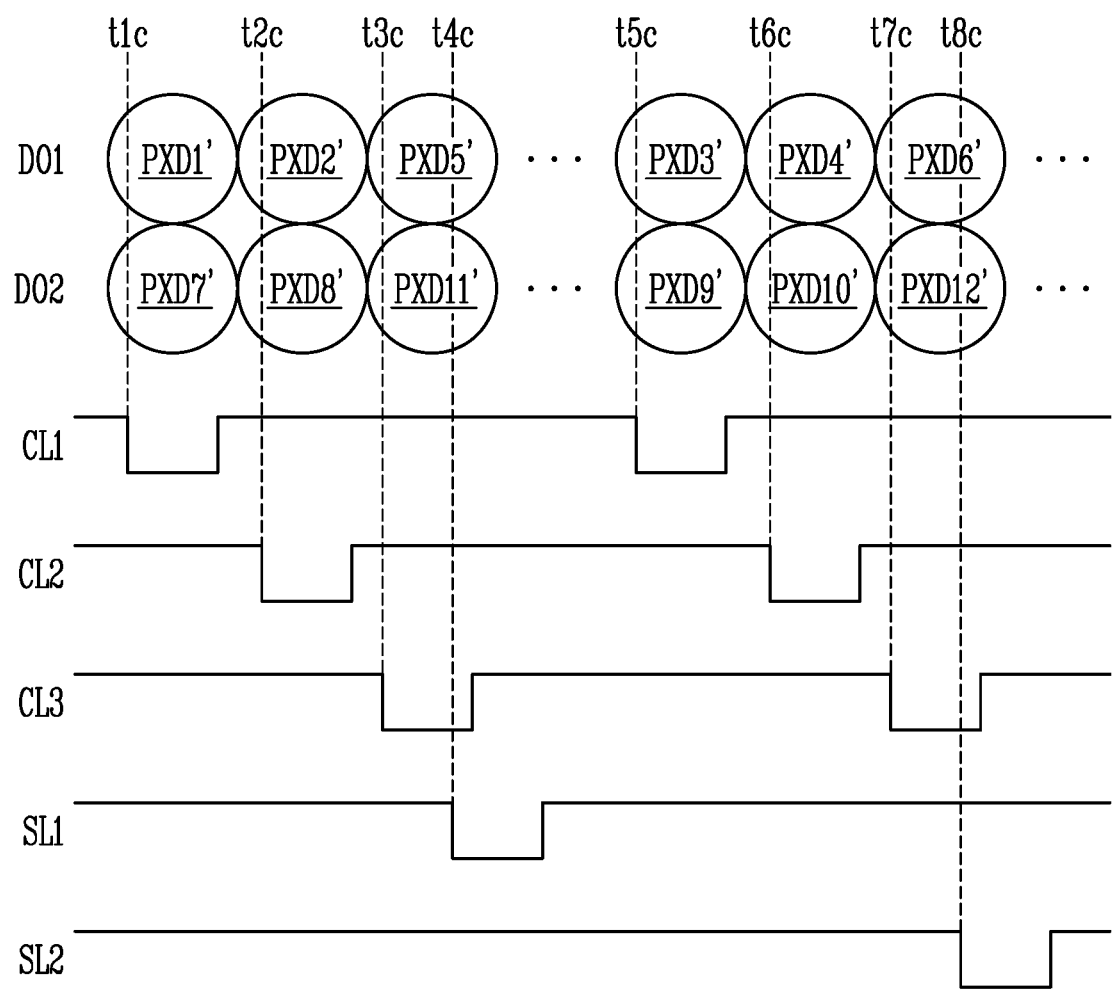
FIG. 14 is a diagram illustrating a driving method of the display device in accordance with another embodiment of the present disclosure.

FIG. 14 is a diagram illustrating a driving method of the display device in accordance with another embodiment of the present disclosure.

First, at a time t1c, a first control signal having a turn-on level (low level) may be applied to the first control line CL1. Accordingly, the first transistors M11' and M12' are turned on, the first data output line DO1 and the first data line DL1 are coupled to each other, and the second data output line DO2 and the first data line DL4 are coupled to each other. A data driver 12' may output a first data voltage PXD1' to the first data output line DO1, and output a first data voltage PXD7' to the second data output line DO2. Therefore, the first data line DL1 may be charged with the first data voltage PXD1', and the first data line DL4 may be charged with the first data voltage PXD7'. A period from the time t1c to a time at which the first control signal having a turn-off level is applied may be referred to as a first period.

Next, at a time t2c, a second control signal having a turn-on level may be applied to the second control line CL2. Accordingly, the second transistors M21' and M22' are turned on, the first data output line DO1 and the second data line DL2 are coupled to each other, and the second data output line DO2 and the second data line DL5 are coupled to each other. The second data line DL2 may be charged with a second data voltage PXD2', and the second data line DL5 may be charged with a second data voltage PXD8'. A period from the time t2c to a time at which the second control signal having a turn-off level is applied may be referred to as a second period.

Next, at a time t3c, a third control signal having a turn-on level may be applied to the third control line CL3. Accordingly, the third transistors M31' and M32' are turned on, the first data output line DO1 and the third data line DL3 are coupled to each other, and the second data output line DO2 and the third data line DL6 are coupled to each other. The third data line DL3 may be charged with a fifth data voltage PXD5', and the third data line DL6 may be charged with a fifth data voltage PXD11'. A period from the time t3c to a time at which the third control signal having a turn-off level is applied may be referred to as a fifth period.

Next, at a time t4c, a first scan signal having a turn-on level may be applied to the first scan line SL1. Accordingly, the first pixels PX1', PX2', PX5', PX7', PX8', and PX11' may receive the data voltages charged in the first data lines DL1 and DL4, the second data lines DL2 and DL5, and the third data lines DL3 and DL6, respectively. In this embodiment, the time tc4 may overlap with the fifth period.

Next, at a time t5c, the first control signal having a turn-on level may be applied to the first control line CL1. Accordingly, the first transistors M11' and M12' are turned on, the first data output line DO1 and the first data line DL1 are coupled to each other, and the second data output line DO2 and the first data line DL4 are coupled to each other. The first data line DL1 may be charged with a third data voltage PXD3', and the first data line DL4 may be charged with a third data voltage PXD9'. A period from the time t5c to a time at which the first control signal having a turn-off level is applied may be referred to as a third period.

Next, at a time t6c, the second control signal having a turn-on level may be applied to the second control line CL2. Accordingly, the second transistors M21' and M22' are turned on, the first data output line DO1 and the second data line DL2 are coupled to each other, and the second data output line DO2 and the second data line DL5 are coupled to each other. The second data line DL2 may be charged with a fourth data voltage PXD4', and the second data line DL5 may be charged with a fourth data voltage PXD10'. A period from the time t6c to a time at which the second control signal having a turn-off level is applied may be referred to as a fourth period.

Next, at a time t7c, the third control signal having a turn-on level may be applied to the third control line CL3. Accordingly, the third transistors M31' and M32' are turned on, the first data output line DO1 and the third data line DL3 are coupled to each other, and the second data output line DO2 and the third data line DL6 are coupled to each other. The third data line DL3 may be charged with a sixth data voltage PXD6', and the third data line DL6 may be charged with a sixth data voltage PXD12'. A period from the time t7c to a time at which the third control signal having a turn-off level is applied may be referred to as a sixth period.

Next, at a time t8c, a second scan signal having a turn-on level may be applied to the second scan line SL2. Accordingly, the second pixels PX3', PX4', PX6', PX9', PX10', and PX12' may receive the data voltages charged in the first data lines DL1 and DL4, the second data lines DL2 and DL5, and the third data lines DL3 and DL6. In this embodiment, the time t8c may overlap with the sixth period.

Figure 15:
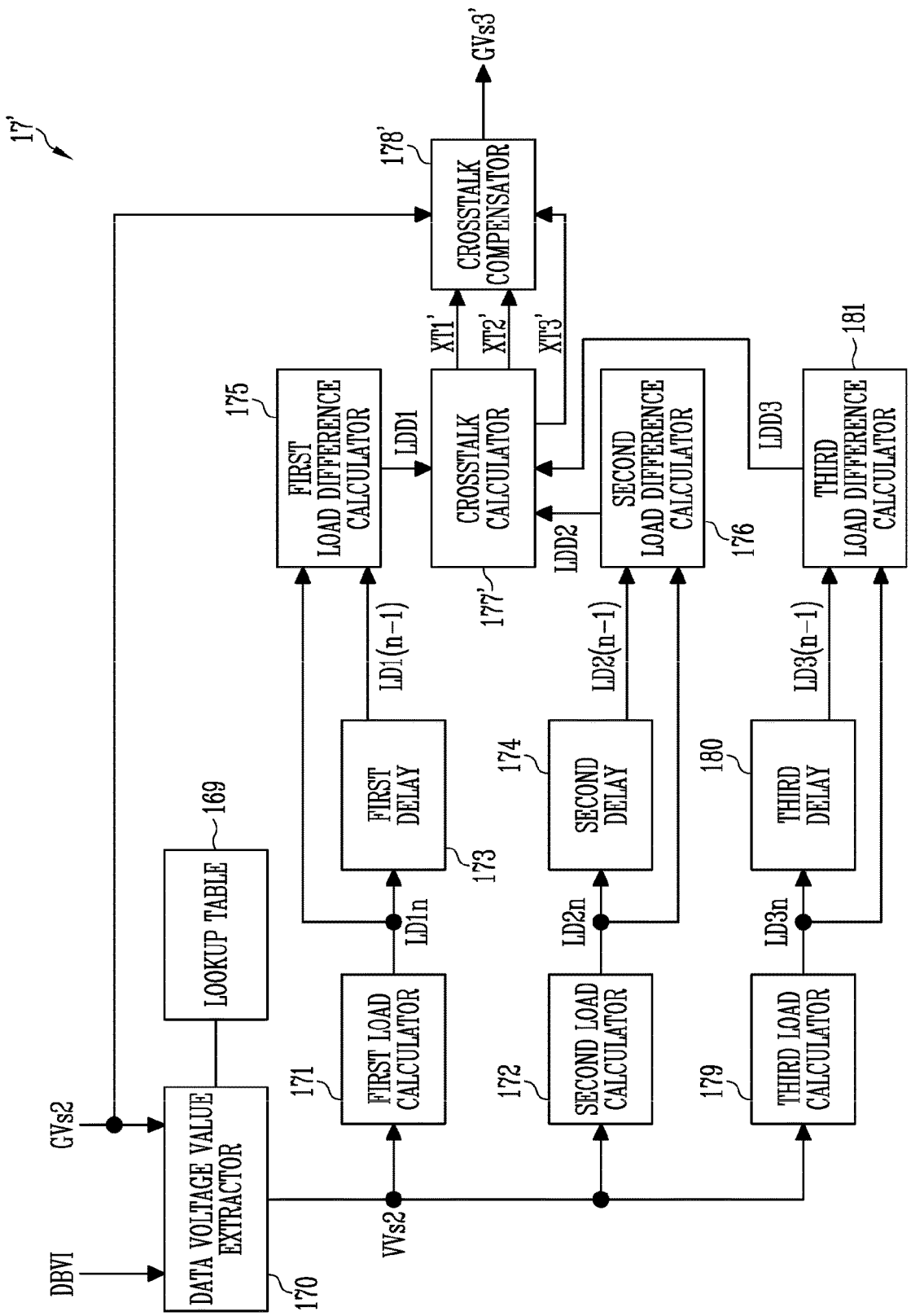
FIG. 15 is a diagram illustrating a data compensator in accordance with another embodiment of the present disclosure.

FIG. 15 is a diagram illustrating a data compensator in accordance with another embodiment of the present disclosure.

The data compensator 17' in accordance with the another embodiment of the present disclosure may include a lookup table 169, a data voltage value extractor 170, a first load calculator 171, a second load calculator 172, a third load calculator 179, a first delay 173, a second delay 174, a third delay 180, a first load difference calculator 175, a second load difference calculator 176, a third load difference calculator 181, a crosstalk calculator 177', and a crosstalk compensator 178'. Hereinafter, portions different from those of the data compensator 17 shown in FIG. 12 will be mainly described.

The data compensator 17' may compensate for the third data voltages PXD3' and PXD9', the fourth data voltages PXD4' and PXD10', and the sixth data voltages PXD6' and PXD12' based on a first load difference LDD1, a second load difference LDD2, and a third load difference LDD3 between the fifth data voltages PXD5' and PXD11' and the sixth data voltages PXD6' and PXD12'.

The third load calculator 179 may calculate a load value by using some of data voltage values VVs2. For example, the third load calculator 179 may calculate a load value by adding up data voltage values supplied to the third data lines DL3 and DL6 among the data voltage values VVs2.

Since the data voltage values VVs2 are sequentially supplied in units of pixel rows, the third load calculator 179 may sequentially calculate and output load values. Referring to FIG. 14, the third load calculator 179 may calculate and output a load value of the fifth data voltages PXD5' and PXD11'. Next, the third load calculator 179 may calculate and output a load value of the sixth data voltages PXD6' and PXD12'. That is, the third load calculator 179 may sequentially output the load value of the fifth data voltages PXD5' and PXD11' and the load value of the sixth data voltages PXD6' and PXD12'.

In an embodiment, each of the load values output from the third load calculator 179 may be MSB of a value obtained by adding up data voltage values. That is, only bits corresponding to the MSB containing the largest amount of information are transferred so that the capacity (bit number) of a register, which the third delay 180 requires, can be minimized.

The third delay 180 may output the load value of the fifth data voltages PXD5' and PXD11' after a predetermined delay time. For example, the third delay 180 may be configured as a delay register. The capacity of the register may correspond to a bit number of the load value. The predetermined delay time may be one horizontal period.

The third load difference calculator 181 may output a third load difference LDD3 based on an output LD3$n$ of the third load calculator 179 and an output LD3($n$−1) of the third delay 180. For example, the output LD3$n$ of the third load calculator 179 may be the load value of the sixth data voltages PXD6' and PXD12'. The output LD3($n$−1) of the third delay 180 may be the load value of the fifth data voltages PXD5' and PXD11'. Therefore, the third load difference calculator 181 may calculate a third load difference LDD3 between the fifth data voltages PXD5' and PXD11' and the sixth data voltages PXD6' and PXD12'.

The crosstalk calculator 177' may calculate a first crosstalk amount XT1' with respect to the third data voltages PXD3' and PXD9', a second crosstalk amount XT2' with respect to the fourth data voltages PXD4' and PXD10', and a third crosstalk amount XT3' with respect to the sixth data voltages PXD6' and PXD12', based on the first load difference LDD1, the second load difference LDD2, and the third load difference LDD3. For example, the first crosstalk amount XT1', the second crosstalk amount XT2', and the third crosstalk amount XT3' may be calculated as shown in the following Equation 2.

$$\begin{bmatrix} XT1' \\ XT2' \\ XT3' \end{bmatrix} = \begin{bmatrix} D11 & D12 & D13 \\ D21 & D22 & D23 \\ D31 & D32 & D33 \end{bmatrix} \begin{bmatrix} LDD1 \\ LDD2 \\ LLD3 \end{bmatrix} \quad \text{Equation 2}$$

D11 may be a first weight value, D12 may be a second weight value, D13 may be a third weight value, D21 may be a fourth weight value, D22 may be a fifth weight value, D23 may be a sixth weight value, D31 may be a seventh weight value, D32 may be an eighth weight value, and D33 may be a ninth weight value.

For example, the first crosstalk amount XT1' may be a value obtained by adding up a first load difference LDD1 to which the first weight value D11 is applied, a second load difference LDD2 to which the second weight value D12 is applied, and a third load value LDD3 to which the third weight value D13 is applied. The second crosstalk amount XT2' may be a value obtained by adding up a first load difference LDD1 to which the fourth weight value D21 is applied, a second load difference LDD2 to which the fifth weight value D22 is applied, and a third load difference LDD3 to which the sixth weight value D23 is applied. The third crosstalk amount XT3' may be a value obtained by adding up a first load difference LDD1 to which the seventh weight value D31 is applied, a second load difference LDD2 to which the eighth weight value D32 is applied, and a third load difference LDD3 to which the ninth weight value D33 is applied.

Here, a sign of each of the first weight value D11, the fourth weight value D21, the fifth weight value D22, the seventh weight value D31, the eighth weight value D32, and the ninth weight value D33 may be different from that of each of the second weight value D12, the third weight value D13, and the sixth weight value D23. For example, each of the first weight value D11, the fourth weight value D21, the fifth weight value D22, the seventh weight value D31, the eighth weight value D32, and the ninth weight value D33 may be a positive number. Each of the second weight value D12, the third weight value D13, and the sixth weight value D23 may be a negative number. As described with reference to FIG. 10, a magnitude and a sign of each of the weight values may be predetermined by considering a voltage decrease width and a voltage increase width.

The crosstalk compensator 178' may compensate the third data voltages PXD3' and PXD9' based on the first crosstalk amount XT1', compensate the fourth data voltages PXD4' and PXD10' based on the second crosstalk amount XT2', and compensate the sixth data voltages PXD6 and PXD12' based on the third crosstalk amount XT3'.

A grayscale value GVs3' output from the crosstalk compensator 178' may include the compensated third data voltages PXD3' and PXD9', the compensated fourth data voltages PXD4' and PXD10', and the compensated sixth data voltages PXD6' and PXD12'.

For example, the crosstalk compensate 178' may increase the third data voltages PXD3' and PXD9' as the first crosstalk amount XT1' increases, increase the fourth data voltages PXD4' and PXD10' as the second crosstalk amount XT2' increases, and increase the sixth data values PXD6' and PXD12' as the third crosstalk amount XT3' increases.

Accordingly, the display device 10 in accordance with the present disclosure 10 can minimize a line crosstalk defect which may occur when the data divider 16' is used.

Figure 16:
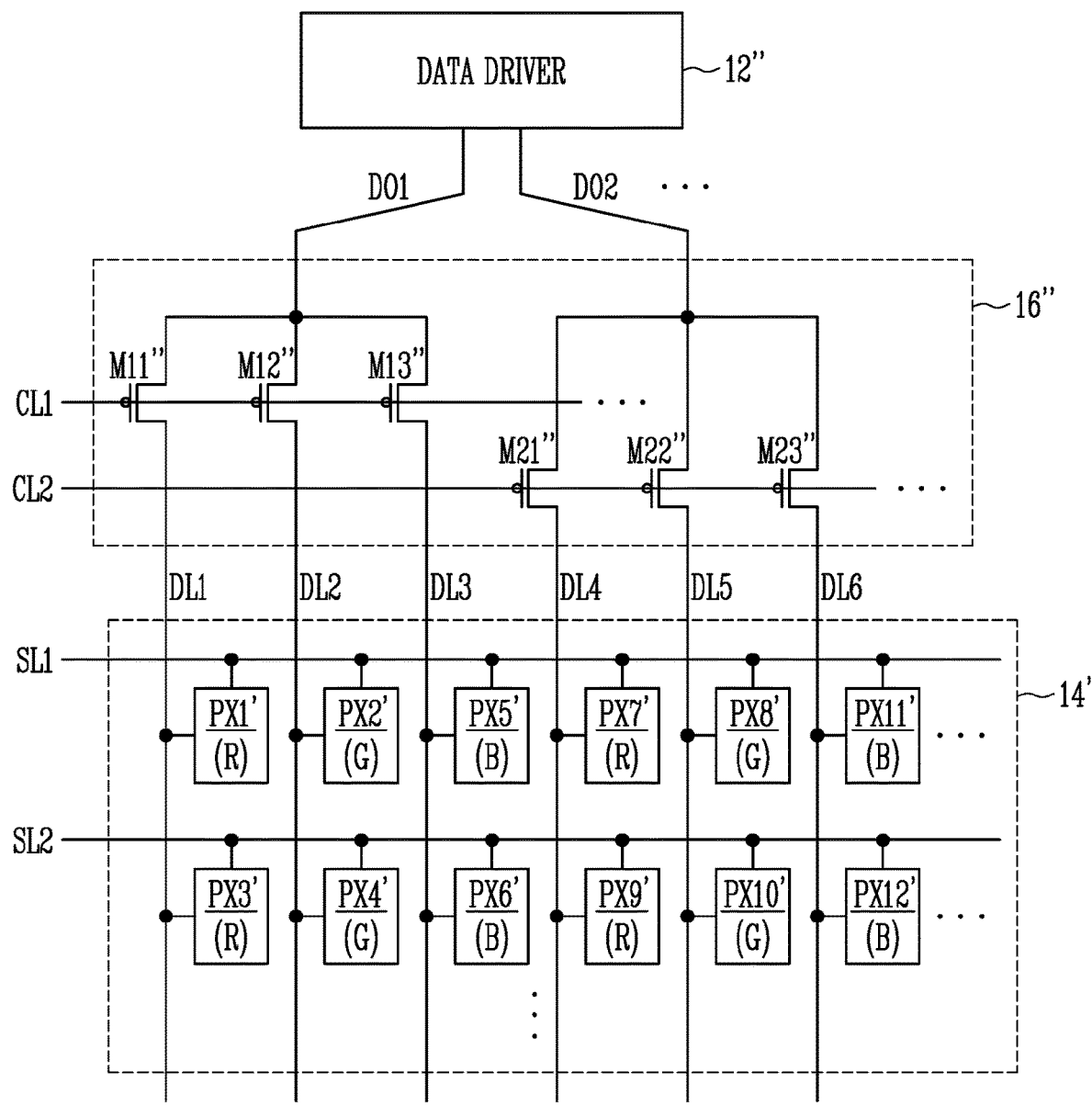
FIG. 16 is a diagram illustrating a data divider and pixels in accordance with still another embodiment of the present disclosure.

FIG. 16 is a diagram illustrating a data divider and pixels in accordance with still another embodiment of the present disclosure.

Referring to FIG. 16, a data driver 12", a data divider 16", and pixels 14' in accordance with still another embodiment of the present disclosure are illustrated. A structure of the pixels 14' may be an RGB stripe structure, like the pixels 14' shown in FIG. 13.

The data divider 16" may include first transistors M11", M12", and M13" and second transistors M21", M22", and M23". Gate electrodes of the first transistors M11", M12", and M13" may be coupled to a first control line CL1, first electrodes of the first transistors M11", M12", and M13" may be coupled to a data output line DO1, and second electrodes of the first transistors M11", M12", and M13" may be coupled to first data lines DL1, DL2, and DL3, respectively. Gate electrodes of the second transistors M21", M22", and M23" may be coupled to a second control line CL2, first electrodes of the second transistors M21", M22", and M23" may be coupled to a data output line DO2, and second electrodes of the second transistors M21", M22", and M23" may be coupled to second data lines DL4, DL5, and DL6, respectively. For example, the data divider 16" may be a demultiplexer having a ratio of input to output, which is 1:3.

A turn-on period of the first transistors M11", M12", and M13" and a turn-on period of the second transistors M21", M22", and M23" may not overlap with each other. The timing controller 11 may sequentially provide control signals have a turn-on level to the first and second control lines CL1 and CL2 such that the first transistors M11", M12", and M13" and the second transistors M21", M22", and M23" are sequentially turned on.

For example, a number of the first transistors M11", M12", and M13" and a number of the second transistors M21", M22", and M23" may be the same. In addition, a number of the first data lines DL1, DL2, and DL3 and a number of the second data lines DL4, DL5, and DL6 may be the same.

The first data lines DL1, DL2, and DL3 corresponding to the first transistors M11", M12", and M13" may be consecutively disposed, and next, the second data lines DL4, DL5, and DL6 corresponding to the second transistors M21", M22", and M23" may be consecutively disposed.

The data divider 16" and the pixels 14', which are shown in FIG. 16, may be driven using the same method as that shown in FIG. 10. Thus, the data compensator as disclosed in FIG. 12 can be applied to the data divider 16" and the pixels 14', which are shown in FIG. 16.

Figure 17:
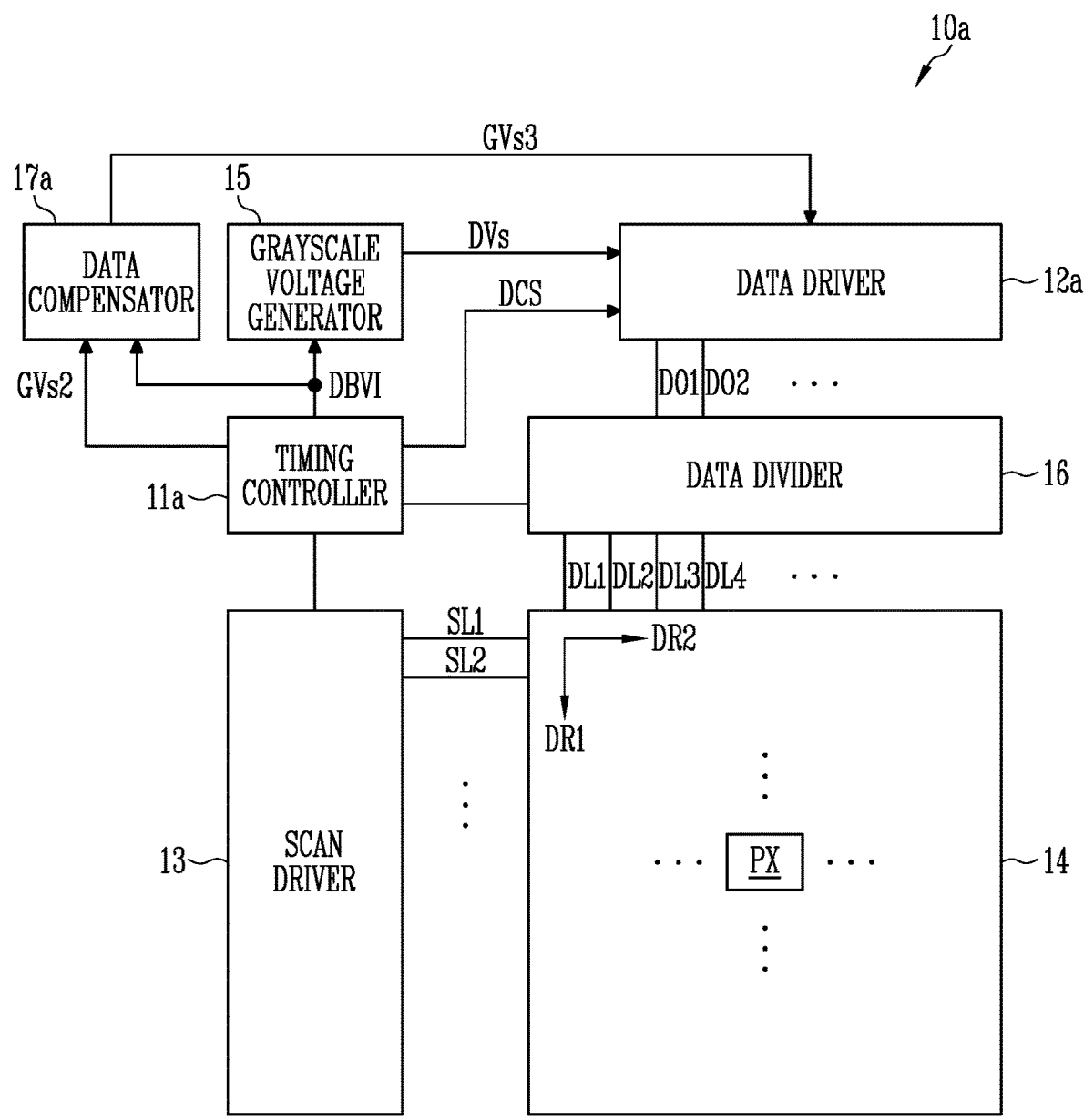
FIG. 17 is a diagram illustrating a display device in accordance with another embodiment of the present disclosure.

FIG. 17 is a diagram illustrating a display device in accordance with another embodiment of the present disclosure.

The display device 10a shown in FIG. 17 may include a timing controller 11a, a data compensator 17a, and a data driver 12a, which are modified.

First, the timing controller 11a may provide grayscale values GVs2 to the data compensator 17a. Next, like the embodiment shown in FIG. 12 or 15, the data compensator 17a may provide the data driver 12a with grayscale values of which line crosstalk defect is compensated (GVs3).

In accordance with this embodiment, unlike the embodiment shown in FIG. 4, the data driver 12a may include a single holding latch. Thus, the configuration of the data driver 12a can be simplified, and cost of the data driver 12a can be reduced.

Figure 18:
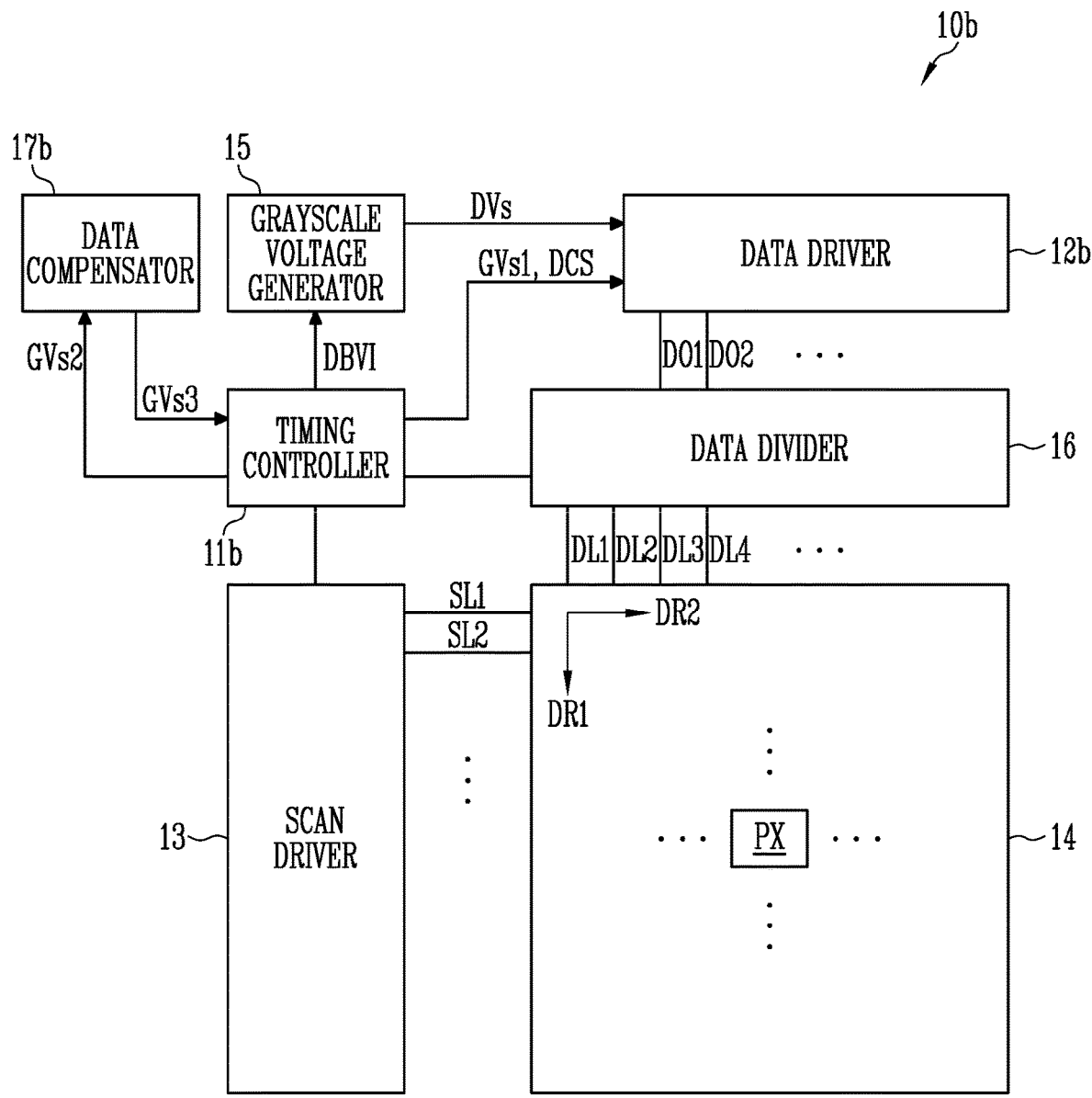
FIG. 18 is a diagram illustrating a display device in accordance with still another embodiment of the present disclosure.
Figure 19:
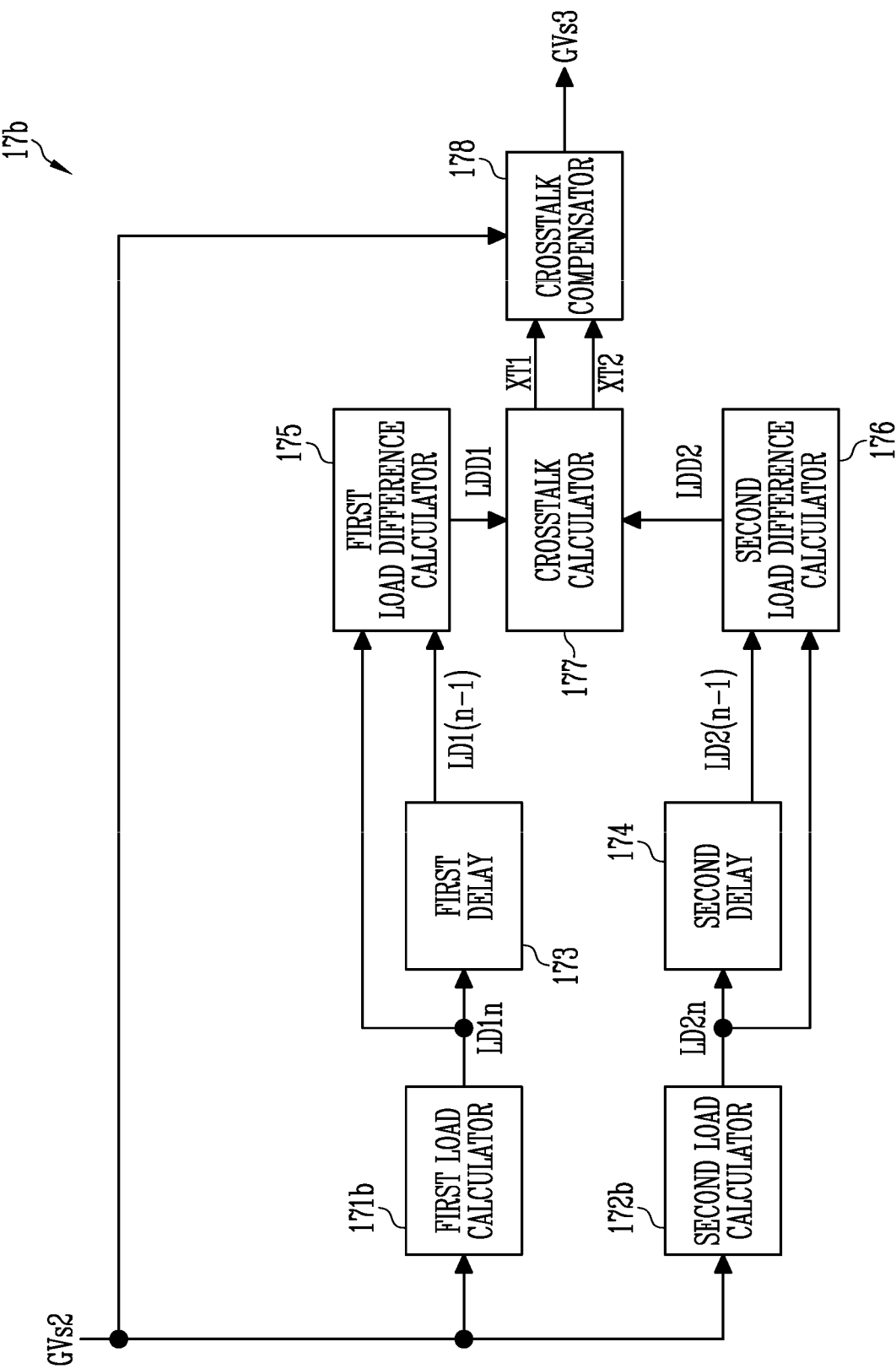
FIG. 19 is a diagram illustrating a data divider in accordance with still another embodiment of the present disclosure.

FIG. 18 is a diagram illustrating a display device in accordance with still another embodiment of the present disclosure. FIG. 19 is a diagram illustrating a data divider in accordance with still another embodiment of the present disclosure.

The display device 10b shown in FIG. 18 may include a timing controller 11b, a data compensator 17b, and a data driver 12b, which are modified.

First, the timing controller 11b may provide grayscale values GVs2 to the data compensator 17b. The data compensator 17b may not include any data voltage value extractor and any lookup table. That is, a first load calculator 171b and a second load calculator 172b may directly use the grayscale values GVs2. The data compensator 17b may generate grayscale values GVs3 of which line crosstalk defect is compensated by using the grayscale values GVs2 instead of data voltage values. Next, the timing controller 11b may provide the data driver 12b with grayscale values GVs1 corresponding to the compensated grayscale values GVs3.

In accordance with this embodiment, unlike the embodiment shown in FIG. 4, the data driver 12b can include the single holding latch. Thus, the configuration of the data driver 12b can be simplified, and cost of the data driver 12b can be reduced.

Further, in accordance with this embodiment, the data compensator 17b does not include any data voltage value extractor and any lookup table. Thus, the configuration of the data compensator 17b can be simplified, and cost of the data compensator 17b can be reduced.

In the display device in accordance with the present disclosure, a line crosstalk defect can be minimized when the data divider is used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
    a data driver configured to provide first data voltages to data output lines during a first period, provide second data voltages to the data output lines during a second period after the first period, provide third data voltages to the data output lines during a third period after the second period, and provide fourth data voltages during a fourth period after the third period;
    a data divider configured to couple the data output lines to first data lines during the first period, couple the data output lines to second data lines during the second period, couple the data output lines to the first data lines during the third period, and couple the data output lines to the second data lines during the fourth period;
    first pixels configured to receive voltages charged in the first data lines and the second data lines after an initial time of the second period and before an initial time of the third period;
    second pixels configured to receive voltages charged in the first data lines and the second data lines after an initial time of the fourth period; and
    a data compensator configured to compensate the third data voltages and the fourth data voltages based on a first load difference between the first data voltages and the third data voltages, and a second load difference between the second data voltages and the fourth data voltages.

2. The display device of claim 1, wherein the data compensator includes:
    a first load calculator configured to sequentially output a load value of the first data voltages and a load value of the third data voltages; and
    a second load calculator configured to sequentially output a load value of the second data voltages and a load value of the fourth data voltages.

3. The display device of claim 2, wherein the data compensator further includes:
    a first delay configured to output the load value of the first data voltages after a predetermined delay time; and
    a second delay configured to output the load value of the second data voltages after the predetermined delay time.

4. The display device of claim 3, wherein the predetermined delay time is one horizontal period.

5. The display device of claim 3, wherein the data compensator further includes:
    a first load difference calculator configured to output the first load difference based on an output of the first load calculator and an output of the first delay; and
    a second load difference calculator configured to output the second load difference based on an output of the second load calculator and an output of the second delay.

6. The display device of claim 5, wherein the data compensator further includes a crosstalk calculator configured to calculate a first crosstalk amount with respect to the third data voltages and a second crosstalk amount with respect to the fourth data voltages based on the first load difference and the second load difference.

7. The display device of claim 6, wherein the first crosstalk amount is a value obtained by adding up the first load difference to which a first weight value is applied and the second load difference to which a second weight value is applied, and the second crosstalk amount is a value obtained by adding up the first load difference to which a third weight value is applied and the second load difference to which a fourth weight value is applied.

8. The display device of claim 7, wherein a sign of each of the first weight value, the third weight value, and the fourth weight value is different from that of the second weight value.

9. The display device of claim 8, wherein the data compensator further includes a crosstalk compensator configured to compensate the third data voltages based on the first crosstalk amount and compensate the fourth data voltages based on the second crosstalk amount.

10. The display device of claim 9, wherein each of the first pixels and the second pixels includes a P-type transistor,
wherein each of the first weight value, the third weight value, and the fourth weight value is a positive number, and the second weight value is a negative number, and
wherein the crosstalk compensator increases the third data voltages as the first crosstalk amount increases and increases the fourth data voltages as the second crosstalk amount increases.

11. The display device of claim 5, wherein the data driver provides fifth data voltages to the data output lines during a fifth period between the second period and the third period, and provides sixth data voltages to the data output lines during a sixth period after the fourth period,
wherein the data divider couples the data output lines to third data lines during the fifth period and couples the data output lines to the third data lines during the sixth period, and
wherein the first pixels receive voltages charged in the first data lines, the second data lines, and the third data lines after an initial time of the fifth period and before an initial time of the third period, and
the second pixels receive voltages charged in the first data lines, the second data lines, and the third data lines after an initial time of the sixth period.

12. The display device of claim 11, wherein the data compensator compensates the third data voltages, the fourth data voltages, and the sixth data voltages based on the first load difference, the second load difference, and a third load difference between the fifth data voltages and the sixth data voltages.

13. The display device of claim 12, wherein the data compensator further includes a third load calculator configured to sequentially output a load value of the fifth data voltages and a load value of the sixth data voltages.

14. The display device of claim 13, wherein the data compensator further includes a third delay configured to output the load value of the fifth data voltages after the predetermined delay time.

15. The display device of claim 14, wherein the data compensator further includes a third load difference calculator configured to output the third load difference based on an output of the third load calculator and an output of the third delay.

16. The display device of claim 15, wherein the data compensator further includes a crosstalk calculator configured to calculate a first crosstalk amount with respect to the third data voltages, a second crosstalk amount with respect to the fourth data voltages, and a third crosstalk amount with respect to the sixth data voltages based on the first load difference, the second load difference, and the third load difference.

17. The display device of claim 16, wherein the first crosstalk amount is a value obtained by adding up the first load difference to which a first weight value is applied, the second load difference to which a second weight value is applied, and the third load difference to which a third weight value is applied,
the second crosstalk amount is a value obtained by adding up the first load difference to which a fourth weight value is applied, the second load difference to which a fifth weight value is applied, and the third load difference to which a sixth weight value is applied, and
the third crosstalk amount is a value obtained by adding up the first load difference to which a seventh weight value is applied, the second load difference to which an eighth weight value is applied, and the third load difference to which a ninth weight value is applied.

18. The display device of claim 17, wherein a sign of each of the first weight value, the fourth weight value, the fifth weight value, the seventh weight value, the eighth weight value, and the ninth weight value is different from that of each of the second weight value, the third weight value, and the sixth weight value.

19. The display device of claim 18, wherein the data compensator further includes a crosstalk compensator configured to compensate the third data voltages based on the first crosstalk amount, compensate the fourth data voltages based on the second crosstalk amount, and compensate the sixth data voltages based on the third crosstalk amount.

20. The display device of claim 19, wherein each of the first pixels and the second pixels includes a P-type transistor,
wherein each of the first weight value, the fourth weight value, the fifth weight value, the seventh weight value, the eighth weight value, and the ninth weight value is a positive number, and each of the second weight value, the third weight value, and the sixth weight value is a negative number, and
wherein the crosstalk compensator increases the third data voltages as the first crosstalk amount increases, increases the fourth data voltages as the second crosstalk amount increases, and increases the sixth data voltages as the third crosstalk amount increases.

* * * * *